United States Patent
Suppes

(10) Patent No.: US 8,911,893 B2
(45) Date of Patent: Dec. 16, 2014

(54) CONVECTION BATTERY CONFIGURATION FOR CONNECTIVE CARBON MATRIX ELECTRODE

(76) Inventor: Galen J. Suppes, Columbia, MO (US)

(*) Notice: Subject to any disclaimer, the term of this patent is extended or adjusted under 35 U.S.C. 154(b) by 795 days.

(21) Appl. No.: 13/126,971

(22) PCT Filed: Nov. 2, 2009

(86) PCT No.: PCT/US2009/062991
§ 371 (c)(1),
(2), (4) Date: Apr. 29, 2011

(87) PCT Pub. No.: WO2010/051540
PCT Pub. Date: Jun. 5, 2010

(65) Prior Publication Data
US 2011/0206959 A1    Aug. 25, 2011

Related U.S. Application Data

(60) Provisional application No. 61/197,978, filed on Oct. 31, 2008, provisional application No. 61/215,573, filed on May 7, 2009.

(51) Int. Cl.
| | | |
|---|---|---|
| *H01M 4/36* | (2006.01) |
| *H01M 6/24* | (2006.01) |
| *H01M 4/48* | (2010.01) |
| *H01M 6/20* | (2006.01) |
| *H01B 1/04* | (2006.01) |
| *H01G 11/46* | (2013.01) |
| *H01M 2/14* | (2006.01) |
| *H01M 4/04* | (2006.01) |
| *H01M 4/139* | (2010.01) |
| *H01M 6/32* | (2006.01) |
| *H01M 10/04* | (2006.01) |
| *H01M 10/058* | (2010.01) |
| *H01G 11/26* | (2013.01) |
| *H01G 11/32* | (2013.01) |

(52) U.S. Cl.
CPC ............... *H01B 1/04* (2013.01); *H01G 11/46* (2013.01); *H01M 2/14* (2013.01); *H01M 4/0438* (2013.01); *H01M 4/0452* (2013.01); *H01M 4/139* (2013.01); *H01M 6/32* (2013.01); *H01M 10/0413* (2013.01); *H01M 10/058* (2013.01); *H01G 11/26* (2013.01); *H01G 11/32* (2013.01); *Y02E 60/122* (2013.01); *Y02E 60/13* (2013.01)
USPC .......................................... 429/105; 429/101

(58) Field of Classification Search
USPC .................................................. 429/101, 105
See application file for complete search history.

(56) References Cited

U.S. PATENT DOCUMENTS 5,480,742 A * 1/1996 Erez et al. ...................... 429/66
5,643,695 A   7/1997 Barker et al.
(Continued)

OTHER PUBLICATIONS

PCT International Search Report, dated Mar. 18, 2010.

*Primary Examiner* — Patrick Ryan
*Assistant Examiner* — Julian Anthony
(74) *Attorney, Agent, or Firm* — Erickson Kernell Derusseau & Kleypas, LLC

(57) ABSTRACT

Electrode compositions and devices (100) that incorporate the electrode compositions are provided. More specifically, electrode compositions that include carbon that provide a connective network to which metal and/or metal derivatives are deposited are provided. Convection battery devices (100) that incorporate the carbon electrode compositions are also provided.

19 Claims, 11 Drawing Sheets

(56) References Cited

U.S. PATENT DOCUMENTS

| | | | |
|---|---|---|---|
| 5,902,562 A | 5/1999 | Lagasse et al. | |
| 6,704,192 B2 | 3/2004 | Pekala | |
| 7,507,687 B2 * | 3/2009 | Kodas et al. | 502/101 |
| 2006/0172197 A1 | 8/2006 | Zhu | |
| 2007/0290393 A1 | 12/2007 | Tennent et al. | |
| 2009/0136808 A1 | 5/2009 | Kang et al. | |

* cited by examiner

CONVECTION BATTERY CONFIGURATION FOR CONNECTIVE CARBON MATRIX ELECTRODE

FIELD OF THE INVENTION

This document relates to electrode compositions and devices that incorporate the electrode compositions. More specifically, it relates to electrode compositions that include carbon that provide a connective network to which metal and/or metal derivatives are deposited, and further relates to convection battery devices that incorporate the carbon electrode compositions.

BACKGROUND OF THE INVENTION

Most ambient-temperature batteries and many capacitors and fuel cells incorporate various forms of carbon such as carbon black, graphite, and activated carbon. In the context of this application, carbon refers to a solid carbonaceous material having at least 50% carbon with a relatively small proportion of hydrogen. In addition, oxygen may be present in the carbon as well as ash in an amount representative of the feedstock from which the carbon was formed. The stable and conductive material properties of carbon allow carbon to be used as an electrode matrix into which other materials may be incorporated. In some instances, the carbon or active sites in the carbon may participate in key electrochemical reactions. In other instances, a catalyst may be supported on the carbon.

In many existing batteries, carbon is dispersed throughout the electrode but not fully connective. Carbon may be added to the electrodes of these batteries as a few percent in a mixture that is stamped into the shape of the electrode. One problem with this electrode composition is that as other materials enter or exit the electrode during the operation of the battery, possibly expanding or shrinking the electrode in the process, the structural integrity of the matrix may be lost. Shedding may occur as in the case of existing lead-acid batteries. Further, the shape of the electrode may eventually become distorted and adversely affect battery performance, for example when recharging metallic lithium primary batteries. In addition, when electroplating highly reactive metals such as lithium onto electrode materials that include chemical moieties such as oxygen, these moieties may adversely interfere with the electroplating process.

Furthermore, a standard approach to battery design is to minimize the distance between electrodes to a distance typically ranging from about 0.03 to about 10 mm so that diffusion may provide the primary mechanism of ion transport between counter-electrodes. For larger-scaled power sources such as those used in plug-in hybrid electric vehicles or grid electricity storage, other mechanisms of ion transport such as convective flow may enhance the diffusive transport of ions.

A need exists in the art for a carbon electrode that retains its shape as an electrically connective matrix of carbon in the absence of all other electrode materials except the carbon.

BRIEF SUMMARY OF THE INVENTION

Among the various aspects of the invention, therefore, is the provision of a battery electrode composition comprising a porous carbon matrix, wherein the surface area of the porous carbon matrix is at least 1,000 $m^2/g$.

Another aspect of the invention encompasses a battery electrode composition comprising a porous carbon matrix and a chemically active material attached to the porous carbon matrix. Moreover, the surface area of the porous carbon matrix is at least 1000 $m^2/g$ and the chemically active material comprises an active anodic material or an active cathodic material.

A further aspect of the invention provides a convection battery device comprising an anode packed bed, a cathode packed bed, and a pump. The anode packed bed comprises an anode material, wherein the anode material comprises a plurality of anode granules, wherein the packed bed has a permeability greater than 0.02 Darcies and conductivity greater than 0.005 S/m, and wherein the anode material further comprises an active anodic material. The cathode packed bed comprises a cathode material, wherein the cathode material comprises a plurality of cathode granules, wherein the packed bed has a permeability greater than 0.02 Darcies and conductivity greater than 0.005 S/m, wherein the cathode material further comprises an active cathodic material, and wherein the anode packed bed is electrically insulated from the cathode packed bed. The pump provides convection of an electrolyte between the anode packed bed and cathode packed bed.

Yet another aspect of the invention encompasses a convection battery device comprised of at least one cell comprising an anode packed bed, a cathode bed, a pump, and a spacer bed. The anode packed bed has an entrance surface and an exit surface, wherein the anode packed bed has a permeability greater than 0.02 Darcies and conductivity greater than 0.005 S/m, and wherein the anode material further comprises an active anodic material. The cathode bed has an entrance surface and an exit surface, wherein the cathode bed has a permeability greater than 0.02 Darcies and conductivity greater than 0.005 S/m, and wherein the cathode material further comprises an active cathodic material. The pump provides convection of an electrolyte between the anode packed bed and cathode packed bed. The spacer bed is located between the cathode bed and anode packed bed has an entrance surface and an exit surface, wherein the spacer bed has a permeability greater than 0.02 Darcies and conductivity less than 0.001 S/m.

A further aspect of the invention provides a convection battery cell comprised of a first electrode, a last electrode of the same polarity as the first electrode, and at least one counter-electrode located between the first electrode and the last electrode wherein (a) the counter-electrode has a polarity opposite that of the first electrode; (b) the first electrode is connected to the last electrode by an electrical conductor so they act as coupled electrode of one potential; (c) a non-conductive ion exchange spacer having an attached ion molarity functionality greater than 0.05 is located between the first electrode and the counter electrode; and (d) a non-conductive counter-ion exchange spacer having an attached ion molarity functionality greater than 0.05 is located between the counter electrode and the last electrode.

Other aspects and features of the invention are detailed below.

DETAILED DESCRIPTION OF THE INVENTION

Figure 1:
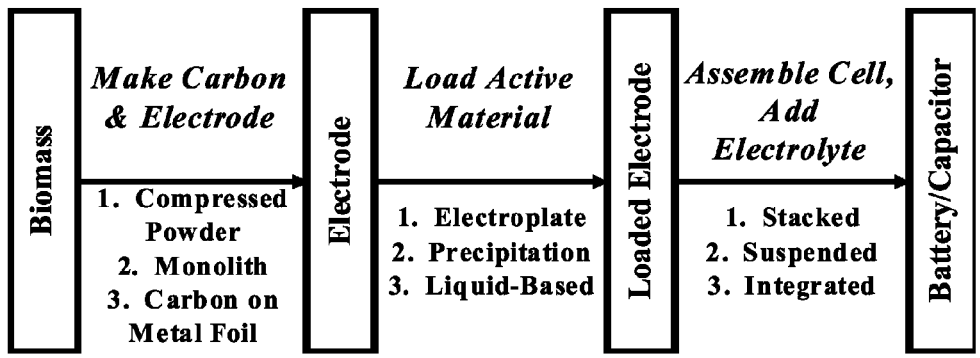
FIG. 1 is a flowchart illustrating the processes of assembling an embodiment of the electrodes.

Embodiments of this invention include battery electrode compositions and convection battery devices that incorporate the battery electrode compositions. Compositions, material properties, and methods of making the battery electrode compositions are described in detail below. In addition, embodiments of convection battery devices that incorporate the battery electrode compositions are described in detail below, as well as methods of using the convection battery devices.

While various embodiments of the battery electrode composition and convection battery device include a porous carbon matrix and the embodiments are discussed below in terms of a porous carbon matrix, other matrices having suitable properties are within the embodiments.

I. Battery Electrode Composition

In an embodiment, the battery electrode composition includes a porous carbon matrix, and may further include a chemically active material. Compositions and material properties of the porous carbon matrix and suitable chemically active materials are described in detail below.

A. Porous Carbon Matrix

Embodiments of the battery electrode composition include carbon in the form of a porous carbon matrix such that if all other components of the battery electrode composition were gone, the carbon matrix would remain a rigid and robust structure. Without relying on any particular theory, because the porous carbon matrix maintains structural integrity throughout each discharge/recharge cycle, a battery incorporating a porous carbon matrix would experience little if any degradation in performance over numerous discharge/recharge cycles.

The porous carbon matrix may be provided in a variety of forms including but not limited to granular, monolith, or attached to a metal foil. An exemplary form of the porous carbon matrix is granular carbon in a spiral battery configuration. The material properties of the porous matrix carbon, including but not limited to its relatively high surface area, make it particularly well-suited for a battery electrode composition.

i. Material Properties of Porous Carbon Matrix

The material properties of the porous carbon matrix are selected to enhance the performance of embodiments of the battery electrode composition, especially in the context of a convective battery device. In particular, porous carbon matrix materials having a relatively high surface area material and high porosity are especially well suited for embodiments of the battery electrode composition. Non-limiting examples of suitable material properties of the porous carbon matrix are summarized in Table 1 below.

TABLE 1

Summary of Material Properties of Porous Carbon Matrix

| Property | Range | Preferred Range | Most-Preferred Range |
|---|---|---|---|
| Conductivity (Siemens/meter) | >0.005 | >0.05 | >0.5 |
| Permeability (Darcies) | >0.02 | >0.5 | >2 |
| Participate Size (Mesh) | 10 and 400 | 30 and 200 | 40 and 140 |
| Surface Area m$^2$/g | >1000 | >2000 | >2500 |
| Porosity cc/cc | >0.50 | >0.65 | 0.77-0.85 |
| Mesopore Volume (cc/g) | >0.5 | >1.0 | 1.5-3.0 |

In one embodiment, the porous carbon matrix has a surface area greater than 2,000 m$^2$/g and a porosity greater than 0.65. Porosity, as used herein, refers to the ratio of pore volume to the total volume of the porous carbon matrix. In an exemplary embodiment, the surface area is greater than 2,500 m$^2$/g and the porosity is greater than 0.77.

Another important material property of the porous carbon matrix is the mesopores volume, defined herein as total volume of pores having a DFT-estimated diameter ranging from about 20 Å to about 500 Å. In one embodiment, the porous carbon matrix has a mesopore volume greater than 0.5 cc/g. In another embodiment, the porous carbon matrix has a mesopore volume greater than 1.0 cc/g. In an exemplary embodiment, the porous carbon matrix has a mesopore volume greater than 1.5 cc/g.

The conductivity and permeability of the porous carbon matrix are other material properties that may significantly influence the performance of a convective battery that incorporates an embodiment of the porous carbon matrix. In one embodiment, the porous carbon matrix has a conductivity greater than 0.005 S/m. In another embodiment, the porous carbon matrix has a conductivity greater than 0.05 S/m. In an exemplary embodiment, the porous carbon matrix has a conductivity greater than 0.5 S/m.

In one embodiment, the porous carbon matrix has a permeability greater than 0.02 Darcies. In another embodiment, the porous carbon matrix has a permeability greater than 0.5 Darcies. In an exemplary embodiment, the porous carbon matrix has a permeability greater than 2 Darcies.

In an embodiment, the porous carbon matrix is granular in form with a mesh size ranging from about 10 to about 400. In another embodiment, the porous carbon matrix granules range in mesh size from about 30 to about 200. In an exemplary embodiment, the porous carbon matrix granules range in mesh size from about 40 to about 140.

B. Chemically Active Material

In an embodiment, the battery electrode composition may include a chemically active material attached to the porous carbon matrix. Suitable chemically active materials may be selected from any electrochemically active material known in the art, including but not limited to an active anodic material and an active cathodic material.

Non-limiting examples of active anodic materials include a metal selected from lithium, zinc, lead, magnesium, manganese, aluminum, and combinations thereof. Non-limiting examples of active cathodic materials include lithium oxide, zinc oxide, lead oxide, magnesium oxide, manganese oxide, aluminum oxide, cobalt oxide, vanadium oxide, titanium sulfate, molybdenum oxide, iron phosphate and combinations thereof.

In one embodiment, the amount of chemically active material attached to the porous carbon matrix is greater than 0.25 cc of chemically active material for every gram of porous carbon matrix, where the loading of the chemically active material is expressed on a gram basis of carbon material free from the active material. Using the density of the chemically active material, these specific volumes of chemically active material may be readily converted to mass fractions of chemically active material.

The intercalated graphite of existing lithium-ion batteries typically have a carbon:Li (C:Li) ratio of about 6:1 or greater. In a fully charged state, an embodiment of the convection battery has a C:Li ratio of less than 6:1, another embodiment has less than 3:1, and an exemplary embodiment less than 1.5:1. This translates to metal-on-metal loading of the carbon after the first layer of lithium is on the carbon. This C:Li ratio may be generally extended to loadings of other metals.

In another embodiment, the amount of chemically active material attached to the porous carbon matrix ranges from about 0.5 cc to about 4.0 cc of chemically active material for every gram of porous carbon matrix. In an exemplary embodiment, the amount of chemically active material attached to the porous carbon matrix ranges from about 0.75 cc to about 3.0 cc of chemically active material for every gram of porous carbon matrix.

II. Method of Making Battery Electrode Composition

FIG. 1 is a summary of the processes of an exemplary method of producing various embodiments of convective battery devices, described in further detail below. Referring to FIG. 1, the porous carbon matrix is made and then may either be included in a battery electrode composition without further treatment, or the porous battery matrix may be loaded with a chemically active material, described above. A non-limiting example of a method of making the porous carbon matrix, as well as several methods of loading the chemically active materials, are discussed in detail below.

A. Method of Making Porous Carbon Matrix

The porous carbon matrix may be produced using any method known in the art, so long as the porous carbon matrix that is produced possesses the material properties specified in Table 1 above. One non-limiting example of a method of producing a porous carbon matrix includes sequential steps of preparing a biomass, acid soaking the biomass, and charring the acid-soaked biomass.

In this example, the method starts with pretreating the biomass and acid soaking the biomass in sequential steps summarized in Table 2. In general, smaller biomass particle size makes soaking easier at lower temperatures, and ensures that acid reaches the center of the biomass particle. Phosphoric acid ($H_3PO_4$) reacts well with the cellulose and lignin contents of the biomass particle compared to other acids. Higher acid content generally leads to better phosphorylation of the ligno-cellulosic matters of the biomass; however very high values may result in over-activation and loss of microporosity. Lower soaking temperatures generally ensure that the attack of the acid on the lignin and hemi-cellulose is not excessive and, hence, the structural damage is minimal before the actual temperature of phosphorylation and cross-linking is reached. Higher temperatures may cause structural changes in the biomass before the correct temperature is reached. Twelve hours of soaking time generally ensures that the acid reaches the interior of the biomass uniformly.

Exemplary conditions for pretreating the biomass includes selecting a biomass from the group including corn cobs, fruit seeds/pits, and wood; reducing the particle size to 5-100 mesh; using phosphoric acid at a concentration of 50-70% in water and mixing acid to biomass at a mass ratio from about 0.8:1 to about 1.3:1; soaking the biomass-acid mixture at 30-75° C. for 8-14 hours; and evaporating the excess water (from acid) at 170° C. for about 2 hours. Other pretreatment conditions are summarized in Table 2 below:

TABLE 2

Summary of conditions for pretreating and acid soaking steps.

| Parameters | Broad Description | Preferred | Best |
|---|---|---|---|
| Pretreating of Biomass | | | |
| Choice of biomass | Any biomass that can be processed to 2-30 mesh | corn cobs, fruit seeds/pits, wood | corn cobs |
| Particle size reduction and control | Smallest dimension less than 5 inches | 5-100 mesh | 20-30 mesh |
| Acid Soaking | | | |
| Choice of acid | phosphoric, boric, sulfuric, zinc chloride and similar dehydrating agents | phosphoric acid | phosphoric acid |
| Acid concentration (in water) | 30-80% | 50-70% | 70% |
| Mass ratio of acid to biomass | 0.2:1 to 1.5:1 | 0.8:1 to 1.3:1 | 0.9:1 to 1:1 |
| Soak temperature | 10-100° C. | 30-75° C. | 30° C. |
| Soak time (duration) | 2-24 hrs | 8-14 hrs | 12 hrs |
| Methodology for removing excess acid | Contact/wash with water, heat to evaporate residual water and some of the acid | Evaporate near 170° C. for about 2 hours | |

Conditions for charring and washing of the char are summarized in Table 3 below. The rate of heating is slow, but not necessary over entire temperature range. The charring time is the period of time at the final temperature; charring occurs even during the heat-up process at temperatures greater than about 300° C. Preferred particle sizes relate to particle sizes that make soaking easier at lower temperatures, and ensure that the acid reaches the center of the particle.

The preferred charring conditions are heating to the charring temperature of at a rate of less than 2° C./min and charring at a temperature between 400 and 600° C. for 0.5 to 3 hours. Exemplary conditions are heating to the charring temperature at a rate of about 0.5° C./min and charring at a temperature of about 450° C. for 1.5 hours.

char with a metal oxide or metal hydroxide of a metal having a molecular weight less than 70 and heating that mixture to a temperature greater than 700° C.

The loading of the active anodic material onto the porous carbon matrix, producing an anode material which functions as a source of electrons when operating as a battery may be performed during the preparation of a char having a surface area greater than 200 $m^2/g$ in one embodiment, >500 $m^2/g$ in another embodiment, and in an exemplary embodiment ranging from about 600 and about 900 $m^2/g$, but may be as low as about 100 $m^2/g$. In this embodiment, the char is mixed with a material containing elemental metal selected from a form

TABLE 3

Summary of conditions for the charring and washing of char.

| Parameters | Broad Description | Preferred | Best |
|---|---|---|---|
| | Charring | | |
| Rate of heating to charring temperature | Whatever is cost effective, faster heating rates may require more-costly equipment | Less than 2° C./min | 0.5° C./min |
| Temperature of charring | 350-850° C. | 400-600° C. | 450° C. |
| Charring time (duration) | 0-24 hr | 0.5-3 hr | 1.5 hr |
| Methodology for washing char | Contact/wash with water | Trickle water through bed of carbon until pH of water is 7 | |
| Particle size reduction and control | Smallest dimension less than 0.5 inches | 5-200 mesh | 20-60 mesh |
| Cooling | Whatever is cost effective, faster heating rates may require more-costly equipment | Less than 2° C./min | <2° C./min |
| Rate of heating to charring temperature | Whatever is cost effective | | |

B. Methods of Attaching Chemically Active Materials to Porous Carbon Matrix

Figure 2:
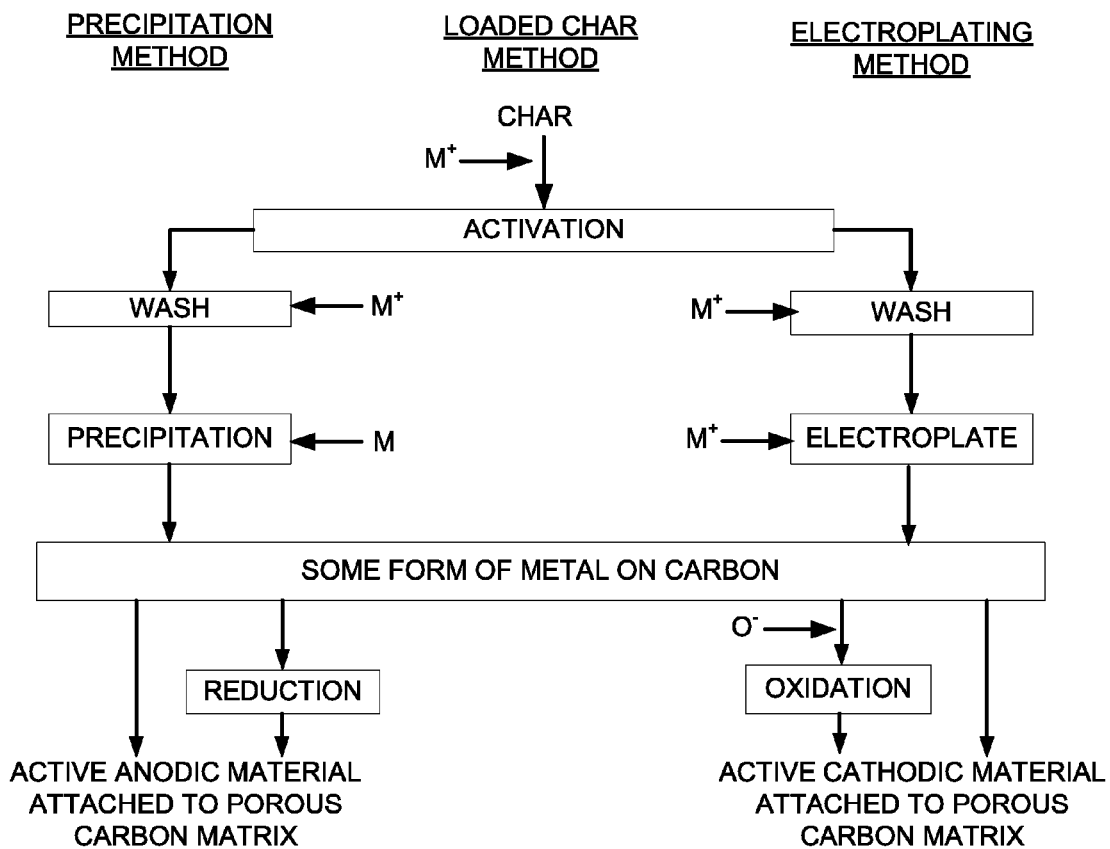
FIG. 2 shows methods of loading carbon with active battery materials

FIG. 2 summarizes a variety of methods of attaching or loading the chemically active materials to the porous carbon matrix. The char resulting from the process of making the porous carbon matrix described above may be loaded with an active anodic material or an active cathodic material by any method known in the art. Three methods are described in detail below: a precipitation method, a loaded char method, and an electroplating method. Each method produces a chemically active material attached to the porous carbon matrix.

i. Loaded-Char Method

An exemplary method of preparing an electrode from the porous carbon matrix of Table 1 includes steps of mixing a including but not limited to metallic, caustic, or oxide. The char and material containing elemental metal are mixed by any means known in the art including but not limited to ball milling in an exemplary embodiment.

As an illustrative example, a fine powder of zinc oxide and char are ball milled to create a fine roughly homogenous powder. After mixing, the mixture is heated to a temperature in excess of 700° C. or in another embodiment >750° C., or in an exemplary embodiment at a temperature ranging from about 750 to about 900° C. for a period of time, ranging from about 0.1 to about 3 hours and in an exemplary embodiment for about 1 hour. Table 4 summarizes the process conditions for various embodiments of the loaded-char method.

TABLE 4

Summary of conditions for adding metal, hydroxide, or oxide with activation.

| Parameters | Broad Description | Preferred | Exemplary |
|---|---|---|---|
| | Adding Metal Containing Material | | |
| Example metal containing materials | KOH, NaOH, LiOH, ZnO, K, Na, Li, $Zn(OH)_2$ | | |
| Mass ratio of base to char | 0.5:1 to 6:1 | 1.5:1 to 5:1 | 2.5:1 to 4:1 |
| Methodology of Addition | | Ball milling solid powders | |

TABLE 4-continued

Summary of conditions for adding metal, hydroxide, or oxide with activation.

| Parameters | Broad Description | Preferred | Exemplary |
|---|---|---|---|
| Activating | | | |
| Rate of heating to activation temperature | Whatever is cost effective, faster heating rates may require more-costly equipment | 5-15° C./min | 9-10° C./min |
| Temperature of activating | 700-1000° C. | 750-900° C. | 800° C. |
| Activating time (duration) | 0.1-24 hr | 0.1-3 hr | 1 hr |
| Cooling | Whatever is cost effective, faster heating rates may require more-costly equipment | Less than 2° C./min | |

The combination of temperature and time for activation is determined such that if the metal were removed by a method including but not limited to washing the carbon, the carbon would have the surface areas and porosities as summarized in Table 1 above. The time and temperature may vary based on the metal containing material added to the char and the properties of the char.

In this loaded-char method, the metal is not washed from the carbon after activation. Rather, the electrode is placed in an appropriate electrolyte including but not limited to propylene carbonate as a battery anode. In some instances, no further reduction is necessary for the anode material to operate in the battery.

In other instances, the metal in the anode material requires further reduction. This may be achieved by any suitable means known in the art including but not limited to charging the anode material with an appropriately selected electrolyte and counter electrode. By way of illustrative example, in a case of zinc oxide heated with char, a propylene carbonate solvent and a carbon felt counter electrode may be used to reduce the anode material.

Alternatively, the metal may be further reduced at elevated temperatures by contacting the loaded activated carbon with a gaseous reducing agent. Hydrogen is an example of a gaseous reducing agent.

Cathode material that includes the porous carbon matrix with attached active cathodic material is prepared in a manner similar to the anode material, only the metal is oxidized while the metal is loaded on the activated carbon. Metal oxides including but not limited to $PbO_2$ and metal salts including but not limited to $FeSO_4$ are often the active components and/or provide the active sites on the cathode material. One method of producing the cathode material is to use an electrochemical configuration to pull electrons from the cathode. Alternatively, the loaded activated carbon may be placed in an oxidizing solution including but not limited to sulfuric acid. A combination of electrochemical and chemical oxidation may also be used, in which the acid solution is used as electrolyte. Alternatively, a selective oxidizing gas may be used to contact the carbon at temperatures above 100° C.

Alternatively, a salt representative of the active component on the cathode of a discharged battery may be loaded onto the preferred char. The char is heated to activate as previously described and as necessary to provide higher surface area and a lodging of the salt into the carbon. This salt-loaded carbon is then placed in a cathode position of a discharged battery configuration. Charging the salt-loaded carbon drives the metal from the cathode material to the anode material to provide a charged battery device.

By way of illustrative example example, $LiFePO_4$ may be loaded onto a char, activated, placed as a cathode material in a battery configuration with unloaded carbon as an anode material, and the system may then be charged, causing Li+ to diffuse to the anode material. Non-limiting examples of suitable salts include $LiBO_2$, $Li_2SiO_3$, and $Li_2MoO_4$.

One embodiment includes an electrode material representative of the salt-loaded carbons resulting from one of the processes described above.

ii. Electroplating Method

Another method of loading a chemically active material onto the porous carbon matrix is an electroplating method. This method may be particularly suitable for use as a commercial process for battery electrode material preparation, especially for an approach in which carbon is put into the battery electrode configuration prior to plating. One embodiment of the electroplating method includes electroplating granular porous carbon matrix in bulk prior to putting the battery electrode material into the battery electrode configuration. An exemplary approach is to take a larger vessel that is >5 gallons, or >50 gallons in another embodiment, or >500 gallons in an exemplary embodiment, and to pack that vessel with the porous carbon matrix that is to be plated. Using methods well-known in the art, the granular porous carbon matrix is compacted in the vessel to provide electrical connectivity through the entirety of the porous carbon matrix bed. Pipes containing non-conductive sections connect the vessel to a second vessel containing the metal that is to be plated onto the carbon. The second vessel may be smaller, but no size constraints are placed on the second vessel. A continuous phase of solvent/electrolyte occupies both vessels and the pipes. An electric circuit connects the metal in the second vessel to the carbon through a voltage sources such that no current flows in this circuit at steady state when no solvent/electrolyte is present. An application of voltage pulls electrons from the metal in the smaller vessel and directs the electrons on the carbon in the larger vessel when solvent/electrolyte is in place. This provides a bulk electroplating of the carbon in the larger vessel. Circulation of fluid by the pump greatly expedites the electroplating process by enhancing the mass transfer of ions through solution. See Examples 3, 4, and 5 for illustrative examples.

The larger vessel has an entrance, exit, and screening means so that liquid flows with about the same contact with all carbon. In the batch mode, screens hold the carbon in the vessel, but other methods known in the art may be used to create a moving bed system that produces results similar to a batch system embodiment.

When electroplating highly reactive metals including but not limited to lithium onto materials that have reactive chemical moieties including but not limited to oxygen, an exemplary embodiment of this invention reduces the reactive moieties prior to electroplating. The preferred means to reduce the carbon or carbon moieties prior to plating is to react the carbon with a gaseous reducing agent at temperatures above 100 C in an embodiment, preferably above 250° C. in another embodiment, more preferably above 350° C. in yet another embodiment, and most preferably ranging from about 450° C. to about 1050° C. in an exemplary embodiment. An exemplary non-limiting example of a reducing agent is hydrogen. By way of illustrative example, hydrogen gas is contacted with the carbon in the final stages of high temperature activation. By way of an alternative example, carbon that is washed is placed back into the oven and contacted with hydrogen at a temperature near 700° C. Plating is then performed on the reduced carbon.

This approach to plating with highly reactive metals is not limited to electroplating on carbon. By way of non-limiting example, organic materials with carbon contents of lower than 50% carbon, including but not limited to biomass that has a high oxygen content, some of which is contained in moieties of lower reactivity and/or moieties of limited accessibility may be plated using the methods described above.

The anodic material resulting from the anodic carbon activation described above may further be reduced or electroplated in this configuration to either increase metal loading or to create a more-reduced state.

The metal that has been loaded on the anodic material may be further oxidized to produce a cathodic material. By way of non-limiting example, lead may be oxidized to lead sulfate with sulfuric acid and the resulting lead sulfate may be further oxidized to lead oxide by electrochemical oxidation to form a cathode material for a lead-acid battery device. This approach may require an oxidizing co-reagent.

An alternative approach for producing a cathodic material is to chemically oxidize the metal on the anodic material. By way of a non-limiting example, iron may be plated onto the electrode material using the methods described above and the iron may then be oxidized by contacting the iron with acids including but not limited to phosphoric acid or sulfuric acid. In this illustrative example, hydrogen is evolved and a salt that includes iron in an oxidized state forms, at least in part, in place of the iron metal.

Yet another alternative approach is to perform electrolysis of a salt such that the anion of the salt in solution is deposited onto the cathode material. In some instances, a salt with more than one element of metal per compound disassociates such that the one metal becomes a cation and is plated onto the anode while the other metal is part of an anionic complex that is plated onto the cathode.

iii. Precipitation Method

Yet another method of loading a chemically active material onto the porous carbon matrix is an electroplating method. In this process the porous carbon matrix having the material properties described in Table 1 above may be soaked in a solution of the metal cation in a solution where the counter-anion material will decompose to gaseous products at higher temperatures. Non-limiting examples of cations include cations of the metals Pt, Cu, Pd, Cr, Ni, and combinations thereof.

In one non-limiting example, a 2M solution of copper nitrate solution can effectively deposit copper onto the surface of porous carbon matrix surface. After wetting the porous carbon matrix with the solution, the carbon is heated first to drive off the liquid that includes but is not limited to water and then to decompose the counter anion. The final result is a deposited metal that may be reduced or oxidized by methods previously described above. Example 2 below describes another embodiment of this method.

III. Convection Battery Device

In one embodiment, a convection battery device includes an anode packed bed of anode material, a cathode packed bed of cathode material, and a pump that provides convection of an electrolyte between the cathode packed bed and the anode packed bed. Various embodiments of the convection battery device use convective flow of electrolyte through the anode and cathode to allow large packed beds to replace prior battery designs that included multiple layers of separators and thin electrodes. The convection of the electrolyte supplements the diffusive ion transport mechanisms in the anode packed bed and the cathode packed bed, significantly enhancing overall battery performance.

Another embodiment of a convection battery device also includes a spacer bed between the cathode bed and the anode bed. Yet other embodiments further include additional cathode packed beds and anode packed beds.

The four key categories of components in the embodiments of the convection batteries of this invention are: carbon (carbonaceous material that contains greater than 50% carbon element, preferably greater than 75% carbon element), active anodic material, active cathodic material, and the electrolyte. By way of illustrative example, a lead acid embodiment of a convection battery includes lead as the active anodic material in the pores of a porous carbon matrix at the anode and lead oxide as the active cathodic material in the pores of the porous carbon matrix at the cathode.

A. Overview of Convection Battery Device

Figure 3:
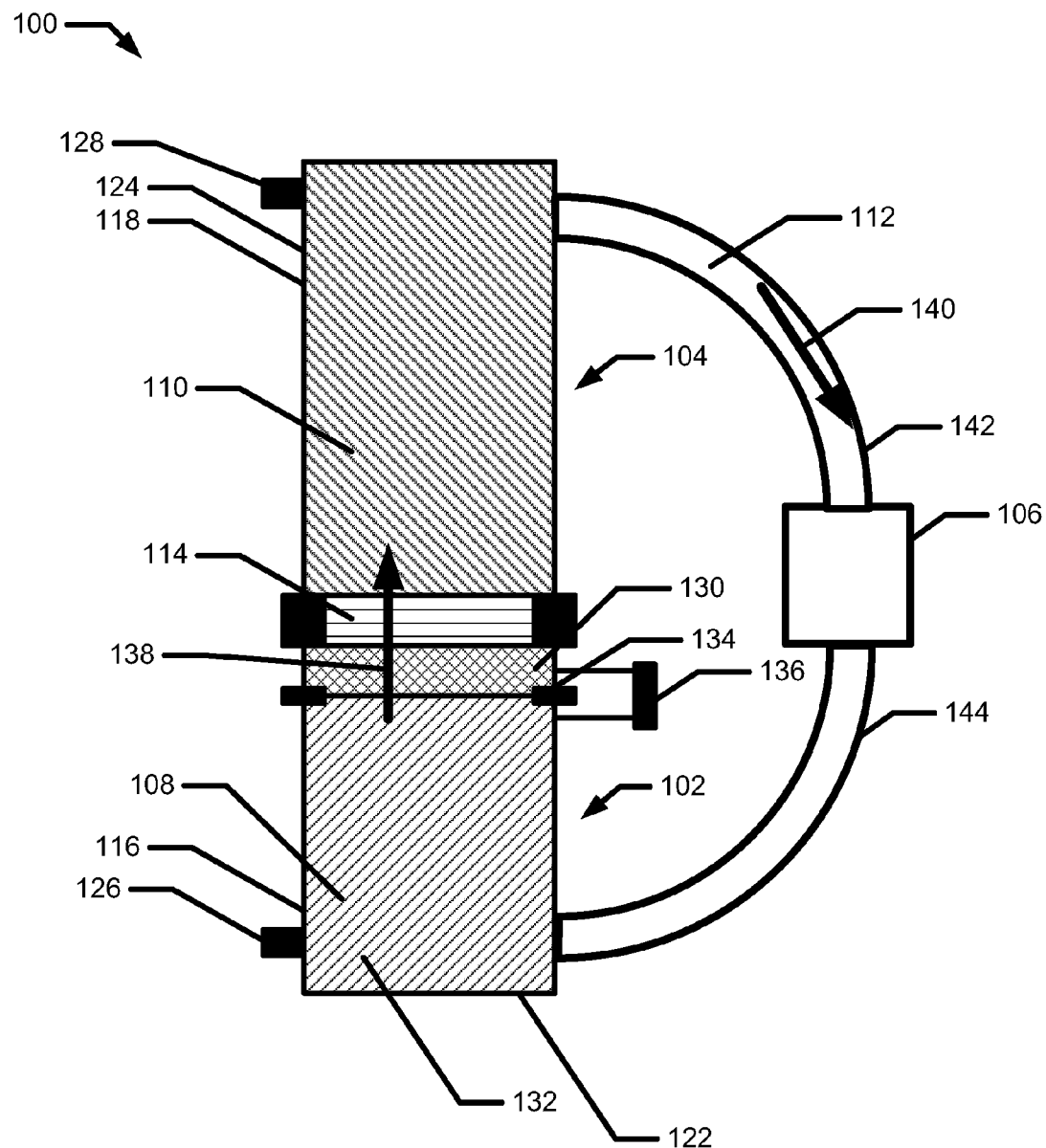
FIG. 3 is an illustration of an exemplary convection battery embodiment.

Referring to the drawings, an embodiment of the convection battery device is illustrated and generally indicated as 100 in FIGS. 3-8. An exemplary embodiment of the convection battery device 100 is illustrated in FIG. 3. The convection battery device 100 includes an anode packed bed 102, a cathode packed bed 104, and a pump 106. The anode packed bed 102 includes an anode material 108 and the cathode packed bed 104 includes a cathode material 110. The anode material 108 functions as the anode of the convection battery device 100, serving as an electron source during the discharging of the convection battery device 100 and absorbing electrons during the recharging of the convection battery device 100. Similarly, the cathode material 110 functions as the cathode of the convection battery device 100, absorbing electrons during the discharging of the convection battery device 100 and serving as an electron source during the recharging of the convection battery device 100.

The pump 106 provides convection to an electrolyte 112 between the anode packed bed 102 and the cathode packed bed 104. The convection of the electrolyte 112 supplements the diffusive ion-exchange mechanisms used by the convection battery device 100 during the discharging and recharging of the device 100, thereby enhancing the overall performance of the device 100. Most battery chemistries known in the art are suitable for use in the embodiments of the convection battery device 100.

The anode packed bed 102 and the cathode packed bed 104 are optionally separated by a non-conductive spacer bed 114, which prevents the occurrence of electrical discharges between the anode packed bed 102 and the cathode packed bed 104. In addition, the material of the spacer bed 114 is porous, so that an electrolyte 112 may pass from the anode packed bed 102 through the non-conductive packing 114 and into the cathode packed bed 104.

The anode packed bed 102 is encased by a conductive anode wall 116, which also functions as an anode current collection element 122 to collect the electrical current from the anode packed bed 102 during the discharge and recharging of the device 100. Similarly, the cathode packed bed 104 is encased by a conductive cathode wall 118 that also functions as a cathode current collection element 124 to collect the electrical current from the cathode packed bed 104 during the discharge and recharging of the device 100. The current collection elements 122 and 124 facilitate reduced resistance in collecting electrons from the active materials in the anode and cathode packed beds 102 and 104 respectively. The spacer bed 114 is encased by a non-conductive spacer wall 120 that electrically isolates the anode wall 116 and the cathode wall 118.

The convection battery device 100 further includes a negative electrical terminal 126 electrically connected to the anode current collection element 122, and a positive electrical terminal 128 electrically connected to the cathode current collection element 124.

Materials and properties of the elements of the exemplary embodiment described above, as well as additional alternative embodiments, are described in detail below.

B. Anode Packed Bed

The anode material 108 included in the anode packed bed 102 includes a plurality of anode granules and an active anodic material. In one embodiment, the plurality of anode granules possess material properties that are similar to the porous carbon matrix granules described above, and the active anodic material is a plurality of discrete reactive anodic granules that are dispersed among the anode granules. In this embodiment, each of the reactive anodic granules are formed into an external shape including, but not limited to a strip, a wire, a filament, a sphere, a shaving, an irregular granule, a filing, and combinations thereof.

In another embodiment, the active anodic material is attached to the anode granules using any of the methods described above. The amount of active anodic material attached to each of the anode granules is greater than 0.25 cc of active anodic material for every gram of anode granules in on embodiment, ranging from about 0.5 cc to about 4.0 cc per gram of anode granules in another embodiment, and ranging from about 0.75 cc to about 3.0 cc in an exemplary embodiment. Non-limiting examples of suitable active anodic materials include a metal selected from lithium, zinc, lead, magnesium, manganese, aluminum, and combinations thereof.

The anode material 108 is selected to be adequately porous to allow the flow of electrolyte 112 through the anode packed bed 102, to contain active anode materials and to allow for electrical connectivity. An illustrative example of an anode material 108 is a mixture of lithium metal with activated carbon. Most anode materials will work provided the packed-bed material specifications are met.

The anode packed bed 102 may be optionally compressed by a compressive force that is greater than 100 kPa in one embodiment, greater than about 300 kPa in another embodiment, and ranging from about 500 kPa to about 1000 kPa in an exemplary embodiment, in order to enhance the electrochemical reactivity of the anode packed bed 102. In these embodiments, the material properties of anode packed bed 102 further include a compressive strength that is higher than the applied compressive force.

In an exemplary embodiment of a convective battery device 100 having a capacity of greater than about one kW-hour, the anode packed bed 102 contains greater than one kg of anode material 108.

C. Cathode Packed Bed

The cathode material 110 included in the cathode packed bed 104 includes a plurality of cathode granules and an active cathodic material. In one embodiment, the plurality of cathode granules possess material properties that are similar to the porous carbon matrix granules described above, and the active cathodic material is a plurality of discrete reactive cathodic granules that are dispersed among the cathode granules. In this embodiment, each of the reactive cathodic granules are formed into an external shape including, but not limited to a strip, a wire, a filament, a sphere, a shaving, an irregular granule, a filing, and combinations thereof.

In another embodiment, the active cathodic material is attached to the cathode granules using any of the methods described above. The amount of active cathodic material attached to each of the cathode granules is greater than 0.25 cc of active cathodic material for every gram of cathode granules in on embodiment, ranging from about 0.5 cc to about 4.0 cc per gram of cathode granules in another embodiment, and ranging from about 0.75 cc to about 3.0 cc for every gram of cathode granules in an exemplary embodiment. Non-limiting examples of suitable active cathodic materials include lithium oxide, zinc oxide, lead oxide, magnesium oxide, manganese oxide, aluminum oxide, cobalt oxide, vanadium oxide, titanium sulfate, molybdenum oxide, iron phosphate and combinations thereof.

The cathode material 110 is selected to be adequately porous to allow the flow of electrolyte 112 through the cathode packed bed 104, to contain active cathode materials and to allow for electrical connectivity. A non-limiting example of a cathode material 110 is iron phosphate with activated carbon. Most cathode materials will work provided the packed-bed material specifications are met.

The cathode packed bed 104 may be optionally compressed by a compressive force that is greater than 100 kPa in one embodiment, greater than about 300 kPa in another embodiment, and ranging from about 500 kPa to about 1000 kPa in an exemplary embodiment, in order to enhance the electrochemical reactivity of the cathode packed bed 104. In these embodiments, the material properties of cathode packed bed 104 further include a compressive strength that is higher than the applied compressive force.

In an exemplary embodiment of a convective battery device 100 having a capacity of greater than about one kW-hour, the cathode packed bed 104 contains greater than one kg of cathode material 110.

D. Spacer Bed

In one embodiment, the anode packed bed 102 and the cathode packed bed 104 are electrically insulated from each other by the spacer bed 114. In this embodiment, the spacer bed 114 includes a non-conductive packing material which has sufficient filtering capabilities at a depth of about 5 mm to keep the anode material 108 and the cathode material 110 physically separated, while allowing electrolyte 112 to flow freely through the spacer bed 114.

In various embodiments, the spacer bed 114 defines a separation between the surfaces. As used herein, the separations between the surfaces is defined as the length of the flow path 130 of electrolyte 112 from the anode packed bed 102 to the cathode packed bed 104. In one embodiment, the spacer bed 114 defines a separation between the surfaces of greater than 0.1 mm in one embodiment, from about 2 mm to about 20 mm in another embodiment, and from about 2 mm to about 10 mm in an exemplary embodiment.

One reason that the spacing between the surfaces is important, without being bound to any particular theory, is that the space between electrodes must facilitate a flow of fluid that has a net charge. As a non-limiting example, in the zinc-alkali battery a net flow of hydroxide ions must flow from the cathode to the anode through the non-conductive spacer bed 114. The flow of charges between electrodes is facilitated by counter-ions exhibiting a zero to near-zero net flow between electrodes. In a diffusion cell, the counter-ions are stationary from a bulk flow perspective. In a convection cell, the counter-ions must maintain a zero to near-zero net flow relative to the electrode entrance/exit surfaces, and to attain this the counter-ions must undergo a diffusion mass transfer against the flow of electrolyte 112, assuming the counter-ions are soluble in the electrolyte 112. Shorter separation between the packed anode bed 102 and the packed cathode bed 104 imparts greater driving force for this diffusion against the flow of electrolyte 112 which leads to higher diffusion rates and better battery performance.

In another embodiment, the separation of the surfaces created by the non-conductive packing material provides a safety margin against discharge. Illustrative examples discussed in detail below illustrate how the distance between the anode packed bed 102 and the cathode packed bed 104 impacts performance with reduced spaces between the electrode beds leading to improved performance.

In general, the properties of the spacer bed 114 are the bulk properties of that bed. In some embodiments, the non-conductive spacer bed 114 may have conductive particles including but not limited to steel shot so long as there is a corresponding nonconductive component including but not limited to glass wool that prevents the overall electrical connectivity of the conductive particles.

An exemplary embodiment of the spacer bed 114 includes non-conductive packing material having a conductivity of less than 0.001 S/m and a permeability similar to that of the anode material 108 and cathode material 110. Further, in an embodiment, the non-conductive packing material should possess sufficient compressive strength to withstand the magnitudes of compressive forces that enhance the connectivity of the anode packed bed 102 and the cathode packed bed 104.

Non-limiting examples of suitable materials included in the spacer bed 144 include crushed ceramic material, glass wool, and ion exchange media, and combinations thereof. In an embodiment stationary counter-ions are included in the spacer bed 114 which may be attained through use of materials including but not limited to an ion exchange material. In an exemplary embodiment, the spacer bed 114 includes an ion exchange media capable of at least partially countering any charge the electrolyte 112 contains as it convects from the anode packed bed 102 to the cathode packed bed 104 or from the cathode packed bed 104 to the anode packed bed 102.

The ion exchange media may be characterized by the density of attached ions and the strength of the sites of these ions. Both of these properties may be assessed by titration methods known in the art. Through the use of bulk density, the density of sites may be converted to units of moles per liter (molarity). The pKa measurement depends upon the solvent used. In various embodiments the pKa solvent is the electrolyte solvent in which the ion exchange material is used.

The pKa of the ion exchange media included in the spacer bed 114 where the spacer bed 114 is situated after the packed cathode bed 104 ranges from about −2 to about 14 in one embodiment, from about 4-12 in another embodiment, and from about 7-12 in an exemplary embodiment. For those embodiments in which the spacer bed 114 is situated after the anode packed bed 102, the pKa of the ion exchange media included in the spacer bed 114 ranges from about −2 to about 14 in one embodiment, from about 0 to about 10 in another embodiment, and from about 0 to about 7 in an exemplary embodiment.

In an embodiment, the ion exchange media facilitates the flow of liquids with net charges. Just as the flow of these charged liquids is necessary between counter-electrodes, flow of charged liquids is also necessary within electrodes. The ion exchange properties of the anode packed bed 102 and cathode packed bed 104 materials are discussed in detail below.

D. Pump

In an embodiment, the pump 106 is selected from any suitable pump known in the art including but not limited to a positive displacement pump. In an exemplary embodiment, the pump 106 is a positive displacement pump producing pulsed flow where the flow pulses are about the same volume as the void volume in the anode packed bed 102.

Referring back to FIG. 3, in one embodiment, the pump 106 provides convection of the electrolyte 112 through a first flow path 138 from the anode packed bed 102 to the cathode packed bed 104, and through a second flow path 140 from the cathode packed bed 104 back to the anode packed bed 102. In this embodiment, the first flow path 138 is defined by the spacer bed 114. The second flow path 140 is defined by a first section of non-conductive tubing 142 and a second section of non-conductive tubing 144, together with the pump 106, form the second flow path 140. The first section of non-conductive tubing 142 includes a first end 146 connected to the cathode packed bed 104 and an opposed second end 148 connected to the pump 106. The second section of non-conductive tubing 144 includes a third end 150 connected to the pump 106 and an opposed fourth end 152 connected to the anode packed bed 102.

Non-limiting examples of other flow paths of electrolyte 112 are discussed below for various alternative embodiments.

E. Electrolyte

The electrolyte has a mole fraction of ions ranging from about 0.02 to about 1.0 in one embodiment, from about 0.1 to about 0.7 in another embodiment, and from about 0.25 to about 0.5 in an exemplary embodiment. The embodiments of electrolytes include, but are not limited to various battery electrolytes known in the art [Any specific electrolytes to list?]. In addition, any specific battery electrolyte composition used in a convective battery device 100 is selected to be compatible with the chemical composition of anode packed bed 102 and the cathode packed bed 104.

F. Prevention of Dendrite Formation

Dendrite formation, a major limitation for the use of metals including but not limited to lithium metal as a rechargeable material is avoided by a number of mechanisms in various embodiments. In one embodiment, a relatively large distance between the anode packed bed 102 and the cathode packed bed 104 limits the ability of dendrites to short-circuit the device 100. In another embodiment, periodic reversal of the direction of the convection of electrolyte 112 causes any dendrite material formed to dissolve before becoming too large. In another embodiment, if dendrite needles form and break off, the packed bed configuration in which the packed beds are under significant compressive force to increase contact and conductivity within the packed beds allows for new areas of electrical contact to be established and for the lithium dendrites to once again become part of the electrode network. In still another embodiment, periodic full discharge may be used to totally dissolve any dendrite formed and to prevent the cumulative growth that may occur over repeated usage.

Referring back to FIG. 3, in yet another embodiment, the anode packed bed 102 has sections of different average voltage where the voltage difference, defined herein as the difference between the anode voltage and the cathode voltage, is less for the anode section adjacent to the cathode packed bed 130 than for a region of the packed anode bed further from the cathode packed bed 132. This lower voltage difference is consistent and functionally important for charging the device 100 where a lower voltage difference corresponds to a lower charging rate and a lower tendency to form dendrite crystals.

In one non-limiting example, for a lithium battery having a zero-load voltage about 3.5 volts, voltage differences may be 0 V for the cathode packed bed 104, −3.7 V for the portions of the anode further from the cathode 132, and −3.55 V for the anode section closer to the cathode packed bed 130. A lower voltage and lower lithium cation concentration exist adjacent to the cathode packed bed, but are separated by the spacer bed 114 so as to minimize dendrite formation, which eliminates dendrite-based battery failure modes.

Still referring to FIG. 3, an embodiment includes the negative electrical terminal 126 on the anode section further from the cathode packed bed 132, and a non-conductive containment wall 134 connecting the anode section further from the cathode packed bed 132 to the anode section closer to the cathode packed bed 130. A resistor 136 provides a path of electrical conductivity between the two anode sections.

Optionally, the spacer bed 114 may include a rotating device (not shown) constructed is a material having a conductivity of less than 0.001 S/m, including but not limited to a serrated disk of plastic, that passes through the path of electrolyte flow and physically disrupts any dendrites that may be growing between the anode packed bed 102 and the cathode packed bed 104.

The design features of various embodiments described above directed to the prevention of dendrite formation overcome historically difficult obstacles limiting the use of lithium metal in anodes. An exemplary embodiment is a lithium convection battery that includes has excess cathode material 110, allowing the lithium in the anode packed bed 104 to be fully dissolved and thereby fully remove any dendrite formed.

IV. Additional Exemplary Embodiments

A. Electrode Metal Plating Method

In various embodiments, the convective battery device 100 may be used to perform the plating of a metal on the anode material 108 of the device 100. Using battery chemistries known in the art, when embodiments of the devices 100 illustrated in FIG. 4, FIG. 5, FIG. 6 and FIG. 8 are operated in a charging mode, defined herein as the charging of the convective battery device 100 in contrast to discharging, the devices 100 perform a plating of metal on to the anode material 108. Suitable metals for plating on the anode material 108 by the device 100 while in a charging mode include but are not limited to lithium, lead, zinc, copper and combinations thereof. In this embodiment, the anode material 108 may include but is not limited to high surface area carbon material, including but not limited to the material described in Table 1 above.

B. Single-Cell Convection Battery Embodiments

Figure 4:
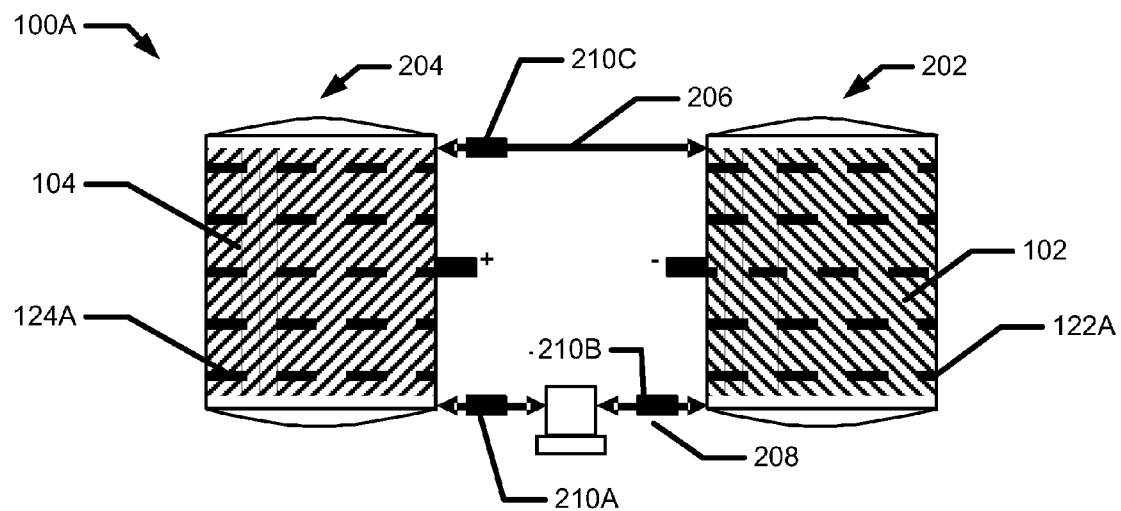
FIG. 4 shows the two-vessel embodiment of a convection battery.

FIG. 4 illustrates an embodiment in which an anode tank 202 contains the anode packed bed 102 and is physically separated from a cathode tank 204 containing the cathode packed bed 104. In this embodiment, a first pipe 206 connecting the anode tank 202 to the cathode tank 204 and a second pipe 208 connecting the anode tank 202 to the cathode tank 204 are constructed of non-conductive materials in their entirety or at least have sections of disconnective conductivity. The tanks 202 and 204 may be constructed of a conductive material. In another embodiment, the anode packed bed 102 may contain anode current collection elements 122A and the cathode packed bed 104 may contain cathode current collection elements 124A to collect the current generated by the corresponding packed beds of each current collection element. This embodiment may also include filter elements 210A-C situated within the first pipe 206 and pipe 208. The separation of the electrode tanks 202 and 204 adds an additional degree of safety in this embodiment.

Figure 5:
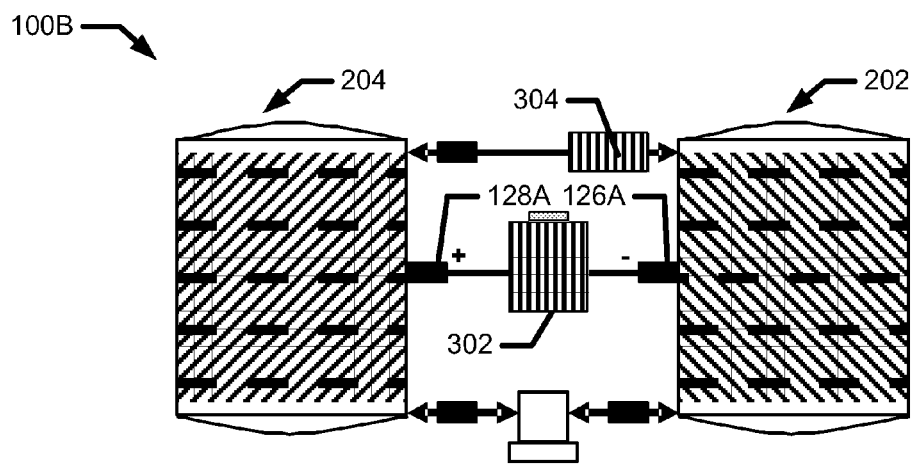
FIG. 5 shows an example of convection battery connected to motor and with radiator.

In another embodiment of the device 100B, FIG. 5 illustrates a motor 302 connected across the negative and positive electric terminals 126A and 128A and a radiator 304 in the circulation loop to provide for heat removal. For embodiments requiring heat removal, placement of the radiator above the packed beds will allow an embodiment with natural convection that will reduce pumping costs. In view of the number of pumps commonly used on vehicles, the energy expended for pumping fluids to cooling devices including but not limited to radiators is relatively low compared to the energy output. When in low-level use, the pump may be turned off for periods of time. If the pump is used intermittently, the ideal volume of fluid to be pumped is the volume of fluid contained in the larger of the packed beds. Runaway exotherm is not likely to pose an operating limit for a sealed battery embodiment so long as the flow rate of the pump limits ion flow.

Figure 6:
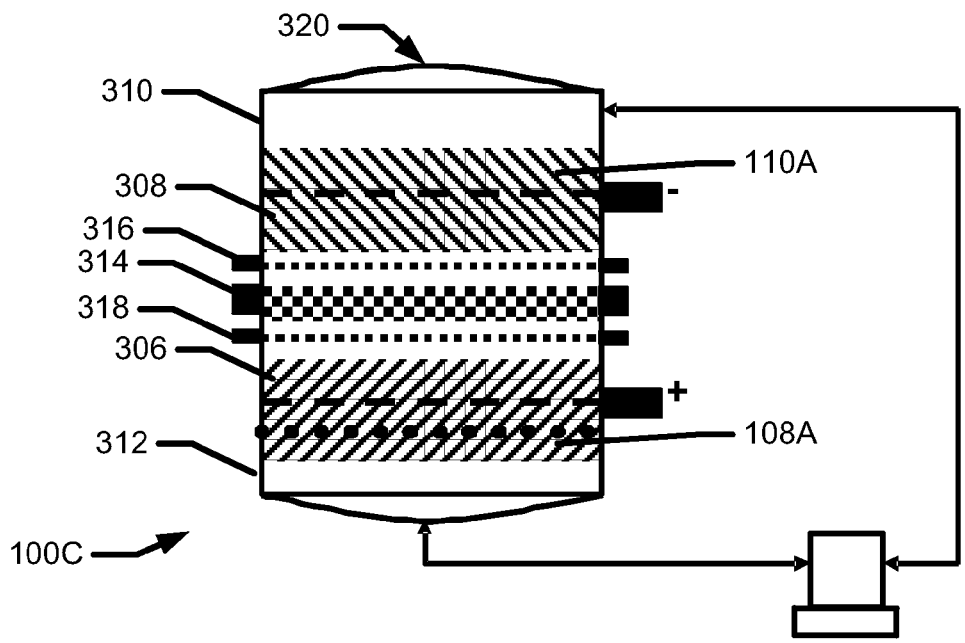
FIG. 6 shows the most preferred tank with upper and lower sections separated by a non-conductive separator.

Yet another embodiment, illustrated in FIG. 6, includes a device 100 in which both the anode packed bed 306 and the cathode packed bed 308 are contained in the same tank 320 made up of an upper electrically conductive tank wall 310, a lower electrically conductive tank wall 312, and a non-conductive separator 314 situated between the upper tank wall 310 and the lower tank wall 312. In one non-limiting illustrative example of this embodiment the upper tank wall 310 is attached to an upper flange 316 that connects with a lower flange 318 that is attached to the lower tank wall 312. A non-conductive grate 314A is situated in a space between the upper tank wall 310 and the lower tank wall 312. The grate 314A seals the upper flange 316 to the lower flange 318 and provides a support upon which the cathode material 110A in the upper section of the tank 320 rests. The fasteners (not shown) connecting the upper flange 316 to the lower flange 318 are selected to be non-conductive in one embodiment so as to ensure that the upper tank wall 310 is electrically insulated from the lower tank wall 312. Non-limiting examples of the fasteners include bolts, nuts, rivets, screws, clamps, adhesive, and combinations thereof. One advantage of this particular embodiment is a reduced pumping loss for circulation of electrolyte 112 relative to other embodiments described herein.

C. Multiple and Coupled Electrode Cell Embodiments

In an embodiment, two or more devices 100 may be connected in series to increase the overall voltage output produced by an assembly of devices 100. One pump motor with several pump heads could be used to reduce the components needed to circulate the electrolyte 112. Methods for connecting batteries in series are well known in the art and may be applied to this embodiment including the use of vessels with dividers that separate electrode sections in a manner similar to the way dividers separate cells in existing lead-acid batteries in common use.

Multiple battery cells may be connected by tubing have a conductivity less than 0.001 S/m where check valve devices disrupts the continuity of electrolyte voltage gradients through use of periodic blocking of the flow path with a material having a conductivity less than 0.001 S/m. By methods known in the art and use of multiple check valves the continuity of voltage gradients through the electrolyte connecting sequential battery cells may be maintained in a state of disturbance by a non-conductive surface.

In yet other embodiments, the convection battery anode may include multiple discrete permeable sections dispersed between multiple discrete permeable sections of the cathode where the flow path of electrolyte through each discrete anode section ranges from about 1 mm to about 2000 mm in one embodiment, from about 5 mm to about 100 mm in another embodiment, and from about 10 mm to about 50 mm in an exemplary embodiment. This arrangement allows for lower flow rates of electrolyte 112 since the electrolyte 112 undergoes repeated replenishing of the active ions between the use of the ions.

Figure 7:
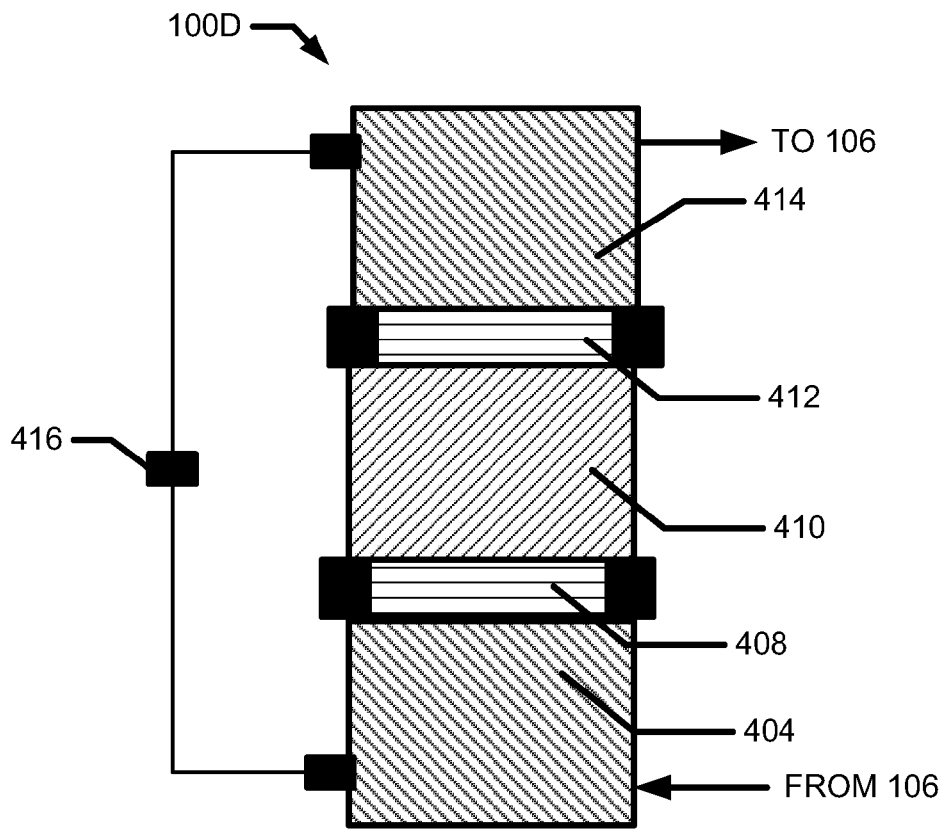
FIG. 7 illustrates an exemplary embodiment of a convective battery that includes ion exchange media.

FIG. 7 illustrates an exemplary embodiment of a convective battery device 100D that includes ion exchange media and has an electrolyte flow entering at the bottom and exiting at the top of the device 100D. The electrolyte 112 contacts the following sections: a) an entrance cathode 404 with ion exchange pKa preferably between 4 and 12 and most preferably between 7 and 12, b) an anion exchange spacer section 406 with ion exchange pKa preferably between 4 and 12 and most preferably between 7 and 12, c) an entrance anode section 408 with ion exchange pKa preferably between 4 and 12 and most preferably between 7 and 12, d) an exit anode section 410 with ion exchange pKa preferably between 0 and 10 and most preferably between 0 and 7, e) a cation exchange spacer 412 with ion exchange pKa preferably between 0 and 10 and most preferably between 0 and 7, and f) an exit cathode 414 with ion exchange pKa preferably between 0 and 10 and most preferably between 0 and 7. The entrance cathode 404 and exit cathode 414 are connected with a conductive element 416 so they function as a single electrode.

In this embodiment the anion exchange spacer 406 facilitates the flow of a fluid having an excess of anions and is positioned where electrolyte flows from a cathode to an anode. The cation exchange spacer 412 facilitates the flow of a fluid having an excess of cations and is positioned where electrolyte flows from an anode to a cathode. The pairing of an anion exchange spacer 406 and a cation exchange spacer 412 facilitates an embodiment where flow to and from the pumping device has a near-zero net charge with the advantage that all charged fluids flow over an ion exchange media that facilitates stabilization of the charged fluid to allow efficient flow of the charged fluid.

The battery cell embodiment of FIG. 7 is summarized as a cathode-anode-cathode cell with coupled ion exchange spacers. In an alternative embodiment, an anode-cathode-anode device with coupled ion exchange spacers achieves similar performance advantages. In this embodiment, the direction of electrolyte flow from the pump 106 includes a sequence of: 1) flow through anode packing, 2) flow through non-conductive ion exchange packing, 3) flow through cathode packing, 4) flow through non-conductive ion exchange packing, 5) flow through anode packing where the two anode packing sections are connected by an electrical conductor including but not limited to a wire so that the two anodes function as a single anode. In this embodiment, the electrolyte flow through the cell starts and ends in anode packing so that the electrolyte had a near-zero charge as it flows through the pump. Alternatively, the electrolyte flow may start and end in cathode packing within the device 100.

As used herein, ion exchange materials with a pKa between 7 and 14 are preferably anion exchange materials while ion exchange materials with a pKa between −2 and 7 are preferably cation exchange materials. An anion exchange material has permanently attached positive charge sites on the material and exhibits the property of being able to reversibly adsorb anions from the surrounding solution.

Figure 8:
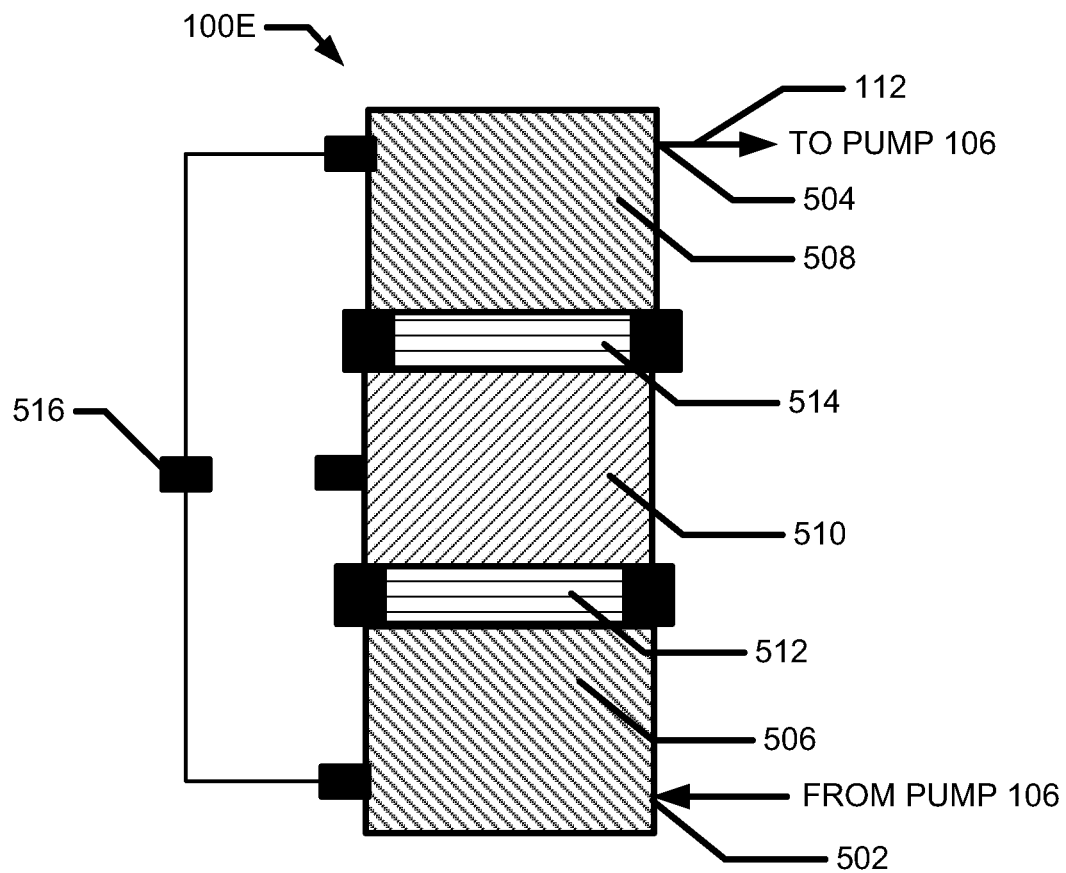
FIG. 8 illustrates a second embodiment of a convective battery that includes ion exchange media.
Figure 9:
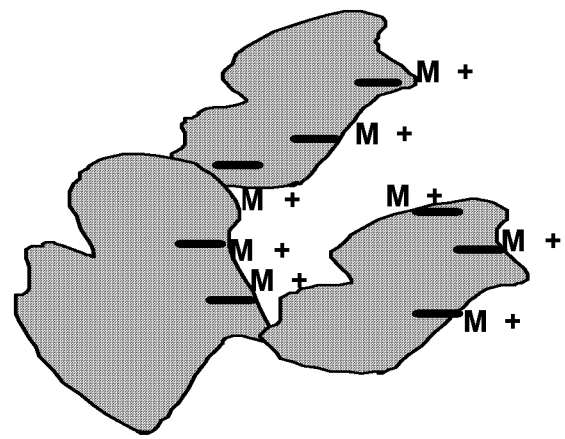
FIG. 9 is an illustration of double layer from electrostatic voltage levels.

Referring to FIG. 8, another embodiment of a multiple cell convective battery device 100E is illustrated. This embodiment includes an electrolyte 112 that flows into and out of the device 110E, an entrance for the electrolyte 502, an exit for the electrolyte 504, an electrode that is the first electrode 506 contacted by the electrolyte 112, an electrode of same polarity as the first electrode that is the last electrode 508 contacted by the electrolyte, at least one counter-electrode 510 located between the first and last electrode, a non-conductive ion exchange spacer 512, a non-conductive counter-ion exchange spacer 514, and a means of electrical connectivity 516 between the first and last electrode.

The embodiments illustrated by FIG. 7 and FIG. 8 are explained in the context of a convective battery device 100 that is producing power. For purposes of the embodiments of this invention, the anode is the electrode where electrons are liberated when the battery is producing power and it remains being referred to as the anode when being charged even though this is contrary to conventions for discussing secondary batteries. The preferred direction of flow of electrolyte during charging is opposite the direction of flow when the battery cell is producing power.

D. Defining Characteristics of Convection Battery Devices

Table 5 provides a final summary of the characteristics of various embodiments of the convection battery device 100 described above.

TABLE 5

Summary of defining characteristics of various convection battery embodiments.

| Property of Device | Units | Preferred | More Preferred | Most Preferred |
|---|---|---|---|---|
| Compressive Force on Packed-Bed | kPa | >100 | >300 | 500-1,000 |
| Non-Conductive Spacer Bed Conductivity | S/m | | Less than 0.001 | |
| Non-Conductive Spacer Bed Permeability | Darcys | | greater than 0.02 | |
| Spacer Ion Exchange Bed After Cathode | pKa | −2 to 14 | 4-12 | 7-12 |
| Spacer Ion Exchange Bed After Anode | pKa | −2 to 14 | 0-10 | 0-7 |
| Spacer Ion Site | Molarity | >0.1 | 0.2-5 | 0.4-2 |
| Anode Bed Ion Exchange | pKa | −2 to 14 | 0-12 | |

TABLE 5-continued

Summary of defining characteristics of various convection battery embodiments.

| Property of Device | Units | Preferred | More Preferred | Most Preferred |
|---|---|---|---|---|
| Anode Bed Ion Site | Molarity | >0.05 | 0.1-2 | 0.4-2 |
| Cathode Bed Ion Exchange | pKa | −2 to 14 | 0-12 | |
| Cathode Bed Ion Site | Molarity | >0.05 | 0.1-2 | 0.4-2 |
| Electrolyte | Mole fraction ions | 0.02-1.0 | 0.1-0.7 | 0.25-0.5 |
| Distance Between Electrodes | mm | >0.1 | 1 to 20 | 2-10 |
| Flow Direction | | | Said distance between electrodes is for fluid flow from anode to cathode (metal to oxide). | |
| Flow Pulse | | | Pulsed in Volumes equal to void volume of the packed bed. | |
| Forced Voltage Gradients and Buffer Layers | | Anode is has sections of different voltage where the voltage difference (anode versus cathode) of a anode next to the cathode is less than that for section(s) further from the cathode | Where the anode terminal is on anode section further from cathode and a resistor connects the anode section further from the cathode to the anode section next to the cathode | |
| Isolation Check Valve, Air Gap, or Other Means to Connect Cells in Series | | | | Double-synchronized positive displacement |
| Path Clearing Separation | | | | Flow-induced Rotating surrogated disc |
| Thickness of Alternating cathode-electrode sections in the same cell | mm | 1 to 2000 | 5 to 100 | 10 to 50 |

V. Charging and Discharging of Battery

In an embodiment, a method of charging (or electroplating if applicable) consists of two steps. Initially, an electrostatic charge is placed on the electrode. This electrostatic charge at a voltage that is about 95% of the voltage at which Faradic reaction occurs on the surface in one embodiment, and ranges from about 90% to about 100% of the Faradic voltage in an exemplary embodiment. Without relying on any particular theory, this voltage creates a double layer as illustrated by FIG. 3. In addition, this charging voltage creates a good distribution of the metal cations along the surface of the carbon.

The method of charging of this embodiment further includes placing a pulse voltage on the electrode at a voltage above that where Faradic reaction occurs (Vo). The pulse voltage ranges from about 105% to about 200% of Vo in one embodiment, from about 110% to about 150% in another embodiment and about 125% in an exemplary embodiment. The time duration of the pulse ranges from about 0.1 to about 10 seconds in one embodiment, from about 0.5 to about 5 seconds in another embodiment and from about 1 to about 3 seconds in an exemplary embodiment.

In one embodiment, the initial charge and pulse voltage steps are performed at least once, at least three times in another embodiment, and about ten times in an exemplary embodiment before the application of a steady or dynamic voltage that does not exceed 125% of Vo. The time between pulses should be at least twice the duration of the pulse in one embodiment, at least four times the duration of the pulse in another embodiment, and about 10 times the duration of the pulse in an exemplary embodiment.

VI. Capacitor with Hydrogen Spillover

An alternative embodiment uses the preferred carbon described in Table 1 above in a hybrid battery-capacitor embodiment. In this embodiment, hydrogen has the ability to adsorb onto the surface. The activated carbon may be used in a hydrogen storage tank, wherein the activated carbon has a pore volume greater than 0.5 cc/g for pores with diameters less than 10 Å. The activated carbon contains at least 1% by weight of a metal of atomic weight less than 70. The activated carbon of the hydrogen storage tank may incorporate a co-adsorbent compound at a weight percentage greater than 1% with the compound having a critical diameter between 7.5 Å and 12 Å. The co-adsorbed compound may be a catalyst that promotes conversion of hydrogen cations to monatomic hydrogen including but not limited to platinum.

In this embodiment, a voltage is applied that is higher than a typical supercapacitor voltage so that Faradic reaction occurs and hydrogen cations in solution are converted to monatomic or diatomic hydrogen on the carbon. The electrolyte in this embodiment is a proton donor electrolyte including but not limited to an acid. The voltage is slightly less than that which generates hydrogen gas in this embodiment. An option of this system is for the system to be kept under pressure so as to allow higher voltages and hydrogen storage capacities before hydrogen gas is generated. Preferred pressures are about 20 bar.

EXAMPLES

The following examples illustrate various embodiments of the current invention. It should be appreciated by those of skill in the art that the techniques disclosed in the examples represent techniques discovered by the inventors to function well in the practice of the invention. Those of skill in the art should, however, in light of the present disclosure, appreciate that many changes can be made in the specific embodiments that are disclosed and still obtain a like or similar result without departing from the spirit and scope of the invention, therefore all matter set forth is to be interpreted as illustrative and not in a limiting sense.

Several illustrative examples presented below demonstrated performance advantages due to the incorporation of activated carbon materials having high surface areas as conductive material in electrodes. In other examples carbon is not used in packed beds functioning as electrodes in battery cells. While high surface area carbons are presented as exemplary materials in various battery device embodiments, the battery device embodiments are not limited to use with carbon.

Example 1

Parametric Studies on Activation Process

The following example demonstrates how KOH:char ratios in excess of 2.0 may be used to attain BET surface areas in excess of 3000 m²/g. The char used for this activation was soaked with 50% phosphoric acid at 50° C. for 8 hours, charred at 450° C., and heated to charring temperature at 1° C./min. The samples were activated at a temperature of 800° C. for 1 hour. Table 6 summarizes the parametric study results on activation with KOH. The KC-series density decreased with increasing KOH:char ratios. Micropore volume decreased at KOH:char ratios greater than 3.0.

TABLE 6

Summary of carbons with different ratios of KOH that illustrate how carbon properties can be varied with rate of base application.
Impact of KOH:Char Ratio: KC-Series

| Sample | KOH:C ratio | BET Surface Area m²/g | Micropore Volume cc/g | Mesopore Volume cc/g | Total Pore Volume cc/g | Apparent Density (g/cc) | Porosity (cc/cc) |
|---|---|---|---|---|---|---|---|
| KC1 | 1.5 | 1314 | 3.38E−01 | 0.21 | 0.55 | 0.952 | 0.524 |
| KC2 | 2 | 1724 | 4.90E−01 | 0.19 | 0.68 | 0.847 | 0.576 |
| KC3 | 3 | 2997 | 1.16E+00 | 0.66 | 1.72 | 0.450 | 0.775 |
| KC4 | 4 | 3347 | 5.14E−01 | 1.68 | 2.03 | 0.395 | 0.802 |
| KC5 | 5 | 3837 | 1.52E−01 | 1.86 | 2.01 | 0.398 | 0.801 |

Example 2

Chemical Deposition of Metal on Activated Carbon

It is known that metals including but not limited to Pt, Cu, Pd, Cr, Ni, etc. can be supported on carbon. In order to demonstrate the effectiveness of a highly porous carbon as a support for metals, which can perform as active battery reagents, the loading of a bimetallic copper chromite catalyst was selected for further study. Catalyst activity verified loading of the metals onto the carbon.

The bimetallic copper and chromium catalysts supported on nanoporous carbon were prepared using incipient wet impregnation method. For this, 20 g of carbon obtained from corncobs with a surface area in excess of 3000 m²/g and pore volume greater than 1.5 cc/g was soaked in 2M solution of copper nitrate solution for 60 mins. After the excess liquid was removed, the carbon containing adsorbed copper metal was heated at 110° C. for 2 hrs, then at 300° C. for 1 hr, and finally at 400° C. for 1 hr. The copper containing carbon was than dipped in a 3M solution of chromium nitrite pentahydrate for 1 hr. After the excess liquid was removed, the coated carbon was heated at different temperatures to give the final bimetallic Cu and Cr catalysts. Different concentrations of dipping solutions were used to control the loading the metals on the carbon support.

To test the efficiency of the carbon-supported copper chromite catalysts, the conversion of glycerin to propylene glycol was examined. The conditions of this reaction were within the range where they did not cause gasification of the carbon support of the catalyst. The reaction was conducted at 220° C., and the hydrogen to glycerin mole ratio was about 20:1. Table 7 shows some of the preliminary data on the conversion of glycerin to propylene glycol using carbon supported copper chromite catalyst in powder form carried out in plug flow reactors. Catalyst 1 and Catalyst 2 are catalysts supported on highly porous carbon (similar to the KC3 of Table 5) with different metal loadings. The productivity the copper chromite catalyst supported on activated carbon was greater than that of the conventional (commercial) copper chromite catalyst. Furthermore, lower amounts of the copper chromite catalyst supported on activated carbon provided equivalent conversions.

TABLE 7

Comparison of Commercial Catalyst and Catalyst Supported on Activated Carbon of the Invention.

| Catalyst | Amt of catalyst (g) | Conversion | Productivity ($g_{PG}/g_{catalyst}$) |
|---|---|---|---|
| Catalyst-1 | 1.00 | >99% | 1.02 |
| Catalyst-2 | 1.00 | >98% | 0.95 |
| Commercial | 10 | >99% | 0.16 |

The size of the metal particles on the carbon (observed with electron microscopy) was less than 20 nm, demonstrating that metal particles can be deposited in micropores that constitute a large proportion of the pore size distribution of the activated carbon.

Example 3

Plating of Lead on Carbon

Figure 10:
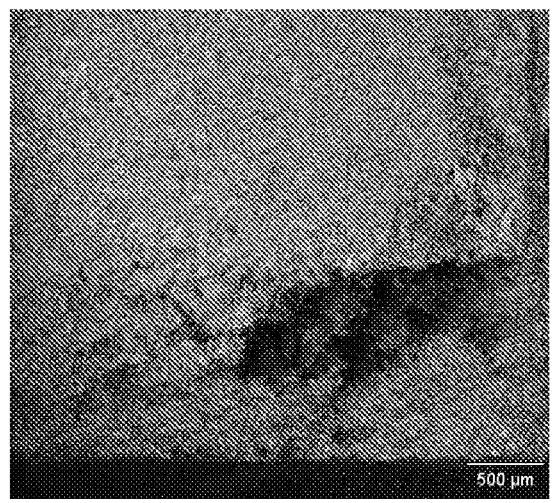
FIG. 10 is the SEM image from MU microscopy core showing lead and carbon elemental map overlay.

The following process was used to electroplate lead on a carbon having a surface area greater than 2,000 m2/g, a porosity greater than 0.65 cc/cc, and a mesopore volume greater than 1.0 cc/g. The carbon was a monolith of a 3K carbon (Table 1) that was formed through use of a binder, heat, and pressure. An electroplating solution of 50 mL Pb(BF$_4$)$_2$, 31.2 mL H$_2$O, 2.65 g boric acid, 18.75 mL HBF$_4$, and 0.30 g Peptone was mixed and placed on hot plate until solution had a uniform orange tint. A carbon electrode (monolith) was placed in an electrode configuration with lead as the counterelectrode. A pulse plating method using 1 second on and 4 seconds off at about 2 volts was applied for about 1 to 2 hours when current flow substantially ended. FIG. 10 illustrates an image of the carbon after being plated with lead illustrating the dispersed lead coverage.

Example 4

Plating of Zinc on Granular Carbon

Figure 11:
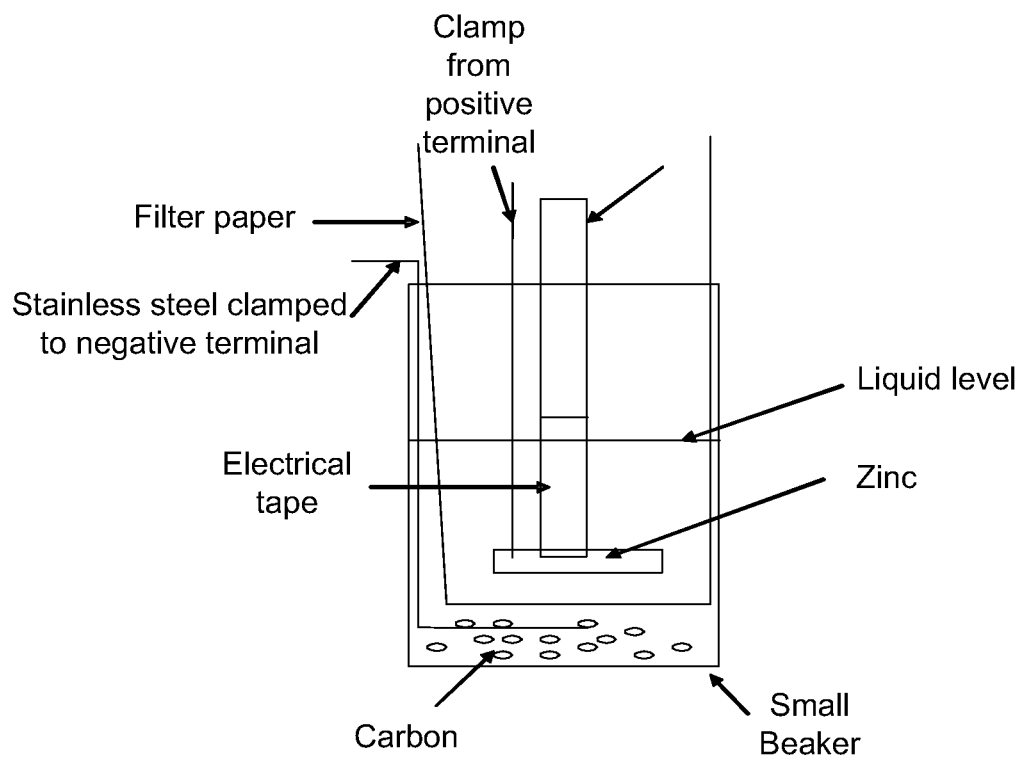
FIG. 11 shows the schematic of a zinc battery using carbon.
Figure 12:
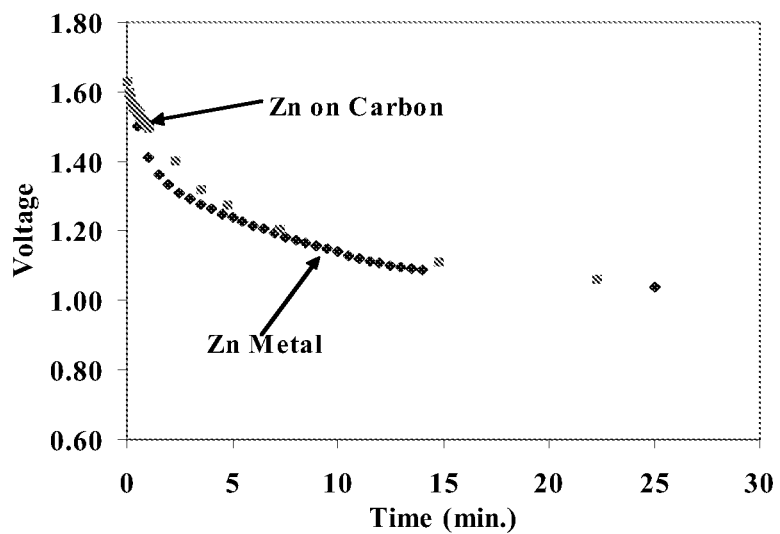
FIG. 12 shows the superposition of performance curves for metallic zinc and zinc on carbon in battery configuration of EC Test Cell.

Granular activated carbon was packed on the bottom of a small (50 ml) beaker. Two layers of filter paper were placed over the carbon and stuck out of the beaker. A large stainless steel strip was placed in the carbon by inserting it down the side of beaker. The portion of the strip located above the carbon was wrapped in electrical tape, and the portion of the strip located in the carbon was unwrapped. A piece of zinc metal was suspended above the filter paper and held in place by the positive wire's clamp of the power supply. The negative wire was clamped to the top of the stainless steel strip. A metal rod wrapped in electrical tape was placed on top of the zinc and filter paper to hold the carbon in place. An electroplating solution of DI water, zinc chloride, and ammonium chloride was poured into the beaker. The zinc chloride and ammonium chloride were both reagent grade: 98% for ZnCl and 99.9% for NH4Cl. About 3-5 grams of each were placed into 200 mL of DI water. The power supply was turned on to about 0.8 Volts. FIG. 11 illustrates the battery configuration. FIG. 12 presents the self-discharge curve for one battery using zinc metal and a second battery using zinc-plated carbon.

Example 5

Zinc Loaded Anode

A char was ball-milled with zinc oxide at a mass ratio of 3:1. This mixture was heated to 850° C. for 1 hour. The zinc-loaded carbon was then placed in an anode position of a zinc-carbon battery. No voltage was detected. The system was charged for a few hours. A voltage of 0.8 volts persisted after charging.

Examples 6-14

Evaluation of Convective Flow Cells

Figure 13:
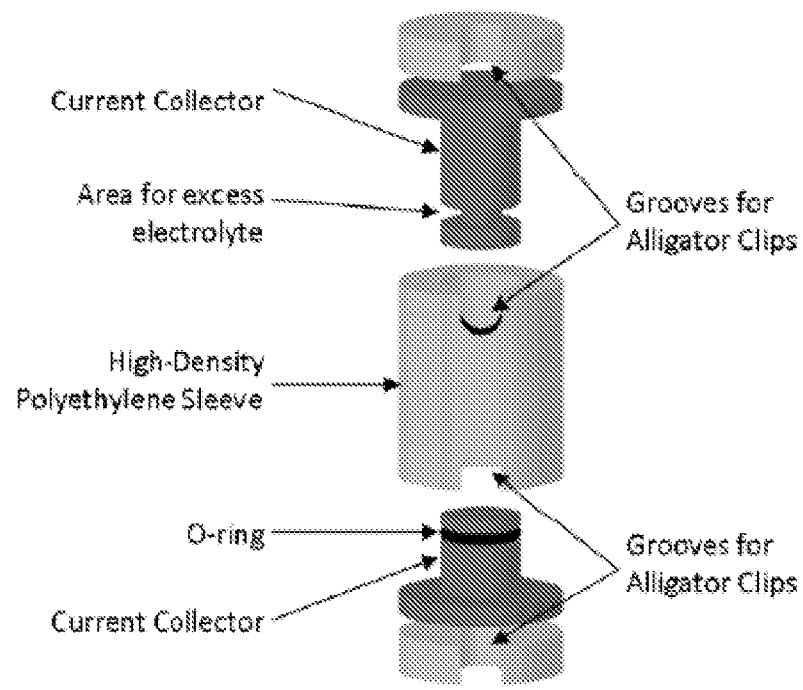
FIG. 13 illustrates the system used to evaluate materials in a diffusion test cell for use as a benchmark for performance.

Presented below are experimental systems and materials used in Examples 6-14.
Experimental System 1—Diffusion Test Cell
FIG. 13 illustrates the system used to evaluate materials in a diffusion test cell for use as a benchmark for performance. The diffusion battery test cell includes, from top to bottom: a stainless steel (SS) piston and top current collector, high-density polyethylene sleeve/cylinder, SS bottom piston and current collector with O-ring. The upper-most and bottom-most pieces were high-density polyethylene spacers with grooves cut to allow alligator clips to fasten to current collectors. The internal ID was 0.5 inches with variable thicknesses of anode and cathode packing possible. Different weights on the piston allow different compressive forces to be applied to the packed beds in the cell.
Experimental System 2—⅜" ID Convection Battery
The convection battery test cell included NPT stainless steel nipples serving as current collectors and containing walls for the anode and cathode packed beds. The non-conductive connectors were ⅜" NPT nylon pipe fittings. Packing from bottom to top included: non-conductive spacer packing, granular anode packing material, non-conductive spacer packing, granular cathode packing material, and non-conductive spacer packing Examples of non-conductive spacer packing includes glass wool, stainless steel shot covered by a non-conductive surface like glass wool, gravel, ceramic packing, non-conductive ion exchange material, and ion exchange resin. The top non-conductive connector section was contained in a plastic T-connector where the electrolyte flowed from the side opening of the T-connector. One end of the T-connector faced downward and connected to the remainder of the cell. The other end of the T-connector faced upward and as open. A rod was placed in the upper open end of the T-connector through which hydraulic compression force was applied. Due to the nature in which the cell was packed, the compressive force transferred to each packed-bed section of the cell.

Experimental System 3—½" Convection Flow Half-Cell
A test cell similar to the diffusion test cell depicted in FIG. 13 included a stainless steel sleeve/cylinder to provide containment for anode or cathode packing A complete cell included the following: 1) a first test cell packed with anode material, 2) Tygon tubing connecting the first test cell to a second test cell, 3) the second test cell packed with cathode material, 4) Tygon tubing connecting the second test cell to an electrolyte reservoir vessel, and 5) Norprene peristaltic pump hose connecting the reservoir vessel to the first test cell. Different weights on the piston allow different compressive forces to be applied to the packed beds in the cell.
Experimental System—Pumping Method
A Masterflex Easy Load II L/S pump head and a Masterflex Console Drive were used with Masterflex size 15 Norprene peristaltic pump hose.
Analysis Circuit
Resistors of 550 and 47 ohms with switching and monitoring with a LabVIEW virtual instrument files, using a PCI-6024E National Instruments data acquisition card connected to a National Instruments SCB-68 shielded I/O connector block.
Materials
Lithium Anode Materials—granular lithium (99+%)
Zinc Anode Materials—zinc course Powder (≥99%), zinc granulate (99.8%, 110-50 mesh, ACS Reagent Grade); zinc dust (<10 microns)
Cathode Materials—manganese(IV) oxide (MnO2) (>99%, Reagent Plus, 60-230 mesh particle size); manganese dioxide powder (Reagent Grade, 10 micron, ≥90%); harvested manganese dioxide recovered from a Duracell process alkali battery
Electrolytes—1 M lithium perchlorate (≥95%, ACS Reagent) in propylene carbonate (anhydrous, 99.7%, Sigma Aldrich); 1 M, 2 M, 3M, and 4M potassium hydroxide (Reagent grade, ≥90%) in distilled water
Conductive Packing Materials—4K activated carbons (See US Patent Publication 20080207442); graphite (approximately 0.2 mm, from Sigma Aldrich); large particle carbon (heat-treated char); stainless steel shot (0.4 mm, Pellets, LLC); stainless steel wool (Briwax Online)
Non-Conductive Packing Materials—glass wool as a filtering separator; ion exchange beads, Amberlyst A26 OH strongly basic (1N NaOH will regenerate) polymeric (ion exchange) resin, and a bed of stainless steel shot placed between insulating layers of glass wool in a plastic connector Example 6

Impact of Compressive Force on Granular Electrode Materials

This example demonstrates the importance of compressive forces to promote electrical connectivity of granular packing. The performance advantage is that granular packing electrodes can be, generally, produced at lower costs than molded or monolith electrodes.

A diffusion battery was assembled using the Experimental System 1—Diffusion Test Cell. The test cell was packed from bottom to top as follows: 1) approximately 0.2 grams of zinc power, 2) a sheet of filter paper punched to fit the 0.5" ID of the test cell, and 3) 90% MnO2 powder. One molar KOH electrolyte was added followed by insertion of the top piston/current collector. Different weights were placed on the top piston to control the compressive force.

Figure 14:
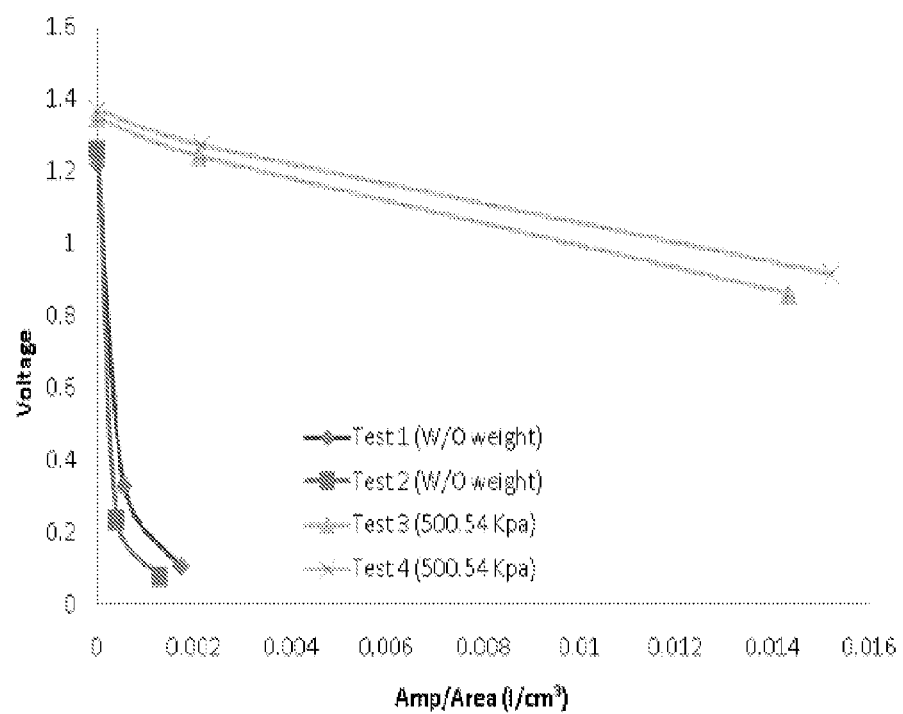
FIG. 14 summarizes the voltages of the test cell battery measured at 30 seconds with a variation in circuit resistances.

FIG. 14 summarizes the voltages of the test cell battery measured at 30 seconds with a circuit resistance of infinite, 467, and 47 ohms to generate the performance curves. The data indicates that a threshold compressive force is critical to achieve good battery performance.

Application of compressive forces greater than 400 kPa produced little improvement in performance. The threshold compressive force for good performance varied from about 200 to 400 kPa. The same trends were qualitatively observed in studies using the convection battery test cell described above.

Example 7

Impact of No Flow on Performance of Convection Battery—Trial 1

This example demonstrates how electrolyte fluid flow improves the performance of the convection battery resulting in performance improvement beyond what is possible with diffusion batteries having the same surface area of non-conductive separator between electrodes.

Two Experimental System 3—½" Convection Flow Half-Cells were connected in series with a 2.5 cm long non-conductive ⅛" NPT pipe nipple to form a battery consisting of a mixture of harvested cathode material in the first half cell, granular zinc in the second cell, and a two-molar potassium hydroxide in water solution as electrolyte. Each cell had 442 kPa of applied compression force due to a weight on the top of each cell. Before each experiment without flow, electrolyte was circulated at open circuit for about 60 seconds.

The experimental procedure consisted of three studies in the following sequence: 1) with flow, 2) without flow, and 3) with flow. For each trial, battery voltage was followed for 3 minutes at open circuit, then at 550 ohms of resistance, and then at 47 ohms of resistance. The battery voltage was measured for 10 min at 550 ohms with no flow to observe the voltage loss due to the lack of ion diffusion. Table 8 summarizes the performance in which a flow rate of about 10 ml/min was used when the electrolyte was pumped. A dramatic drop in voltage for no-flow occurred at about 3 minutes after flow was cut off for the 47-ohm experiment and at about 4.5 minutes for the 550-ohm experiment. The rapid loss of voltage when electrolyte flow was stopped demonstrates that connective fluid flow improves the battery performance.

TABLE 8

Impact of flow for study in system half-cells illustrating that electrolyte flow is necessary for good performance.

| Load | Flow | No Flow | Return of Flow |
|---|---|---|---|
| 550 Ohm Load | 1.34 V | 0.39 V | 1.24 V |
| 47 Ohm Load | 0.48 V | 0.03 V | 0.49 V |

Example 8

Impact of No Flow on Performance of Convection Battery—Trial 2

This example demonstrates how electrolyte fluid flow improves the performance of the convection battery resulting in performance improvement beyond what is possible with diffusion batteries.

The Experimental System 2—⅜" ID Convection Battery was packed with the following materials from the bottom to top: stainless steel shot, glass wool, 1.4 grams of granular zinc in the anode, glass wool, stainless steel shot, glass wool, 147 milligrams of a mixture of 30 wt % manganese(IV) oxide and 4K carbon in the cathode, glass wool, and stainless steel shot. Flow through the cell was set at approximately 3 cm3 per minute. The cell had 4900 kPa of applied compression force from a hydraulic press. The experimental procedure consisted of two trials: 1) with flow, and 2) without flow. For each trial, battery voltage was followed for 3 minutes at open circuit, then at 550 ohms of resistance, and then at 47 ohms of resistance. Before each experiment without flow, the electrolyte was circulated at open circuit for about 60 seconds. Table 9 summarizes the voltages with and without flow for about 6 minutes. For these studies, about 80% of the voltage reduction for no flow (relative to same load with flow) occurred within the first 5 seconds with a steady decrease in voltage after that. When flow was applied, the voltage remained relatively constant at the values indicated in Table 8.

TABLE 9

Impact of flow for study in system half-cells illustrating that electrolyte flow is necessary for good performance.

| Load | Flow | No Flow |
|---|---|---|
| ∞ Ohm Load | 1.26 V | 1.13 V |
| 550 Ohm Load | 0.92 V | 0.50 V |
| 47 Ohm Load | 0.34 V | 0.08 V |

The results indicate a substantial decrease in voltage in the absence of electrolyte flow. Higher voltages in Table 8 relative to Table 9 correspond to a better manganese oxide cathode. The lack of a sudden drop in voltages for Table 9 is attributed to the 4K activated carbon that acts as a supercapacitor for ions and allows improved performance in the absence of fluid flow.

Example 9

Impact of Flow Rate

This example demonstrates how increasing electrolyte fluid flow reaches a point of diminishing returns at higher flow rates. The Experimental System 2—⅜" ID Convection Battery was prepared essentially as described in Example 8 but with 786 milligrams of zinc granules in the anode and 218 milligrams of a 25 wt % manganese(IV) oxide and 75 wt % graphite mixture in the cathode. Flow through the cell was set at approximately 3, 8, and 20 cm3 per minute for low, medium, and high flow, respectively. The cell had 4900 kPa of applied compression force from a hydraulic press.

Figure 15:
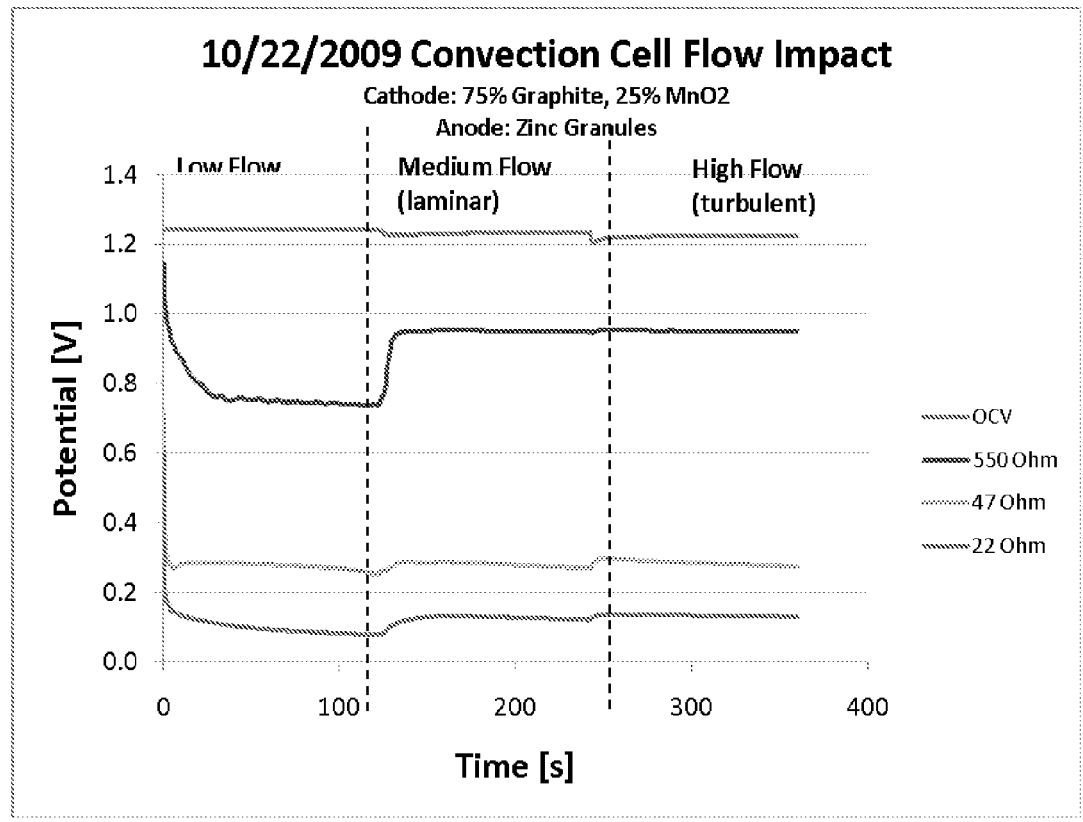
FIG. 15 is a comparison of convection battery performance at varying electrolyte flow rates.

FIG. 15 illustrates that the greatest improvement in performance was observed as flow was increased from zero to moderate (about 5 cm3 per minute) flow rates. Further increases in flow produced minimal improvement.

Example 10

Impact of Electrolyte

This example demonstrated that there is little change in battery performance as the molarity of the electrolyte is changed from 2M to 4M. The Experimental System 2—⅜" ID Convection Battery was prepared essentially as described in Example 8 except that the cathode was packed with approximately one gram of a mixture of 75% graphite and 25% manganese oxide. Flow through the cell was set at approximately 8 cm3 per minute. The cell had 4900 kPa of applied compression force from a hydraulic press.

Table 10 summarizes the voltages at different circuit resistances. The voltage decreased slightly for the 4 molarity electrolyte solution versus the 2 molarity solution, but the change was relatively small compared to other overpotential changes. While voltages were relatively constant when electrolyte was flowing through the cell, the no-flow voltage continuously decreased with the value shown the value after 10 seconds under 47 ohms and no flow.

TABLE 10

Impact of potassium hydroxide molarity on zinc-alkali convection cell voltage.

|  | 2M | 4M |
|---|---|---|
| Open Circuit | 1.26 | 1.27 |
| 550 Ohm | 0.74 | 0.66 |
| 47 Ohm | 0.31 | 0.29 |
| 47 Ohm, No Flow |  | 0.19 |

Figure 16:
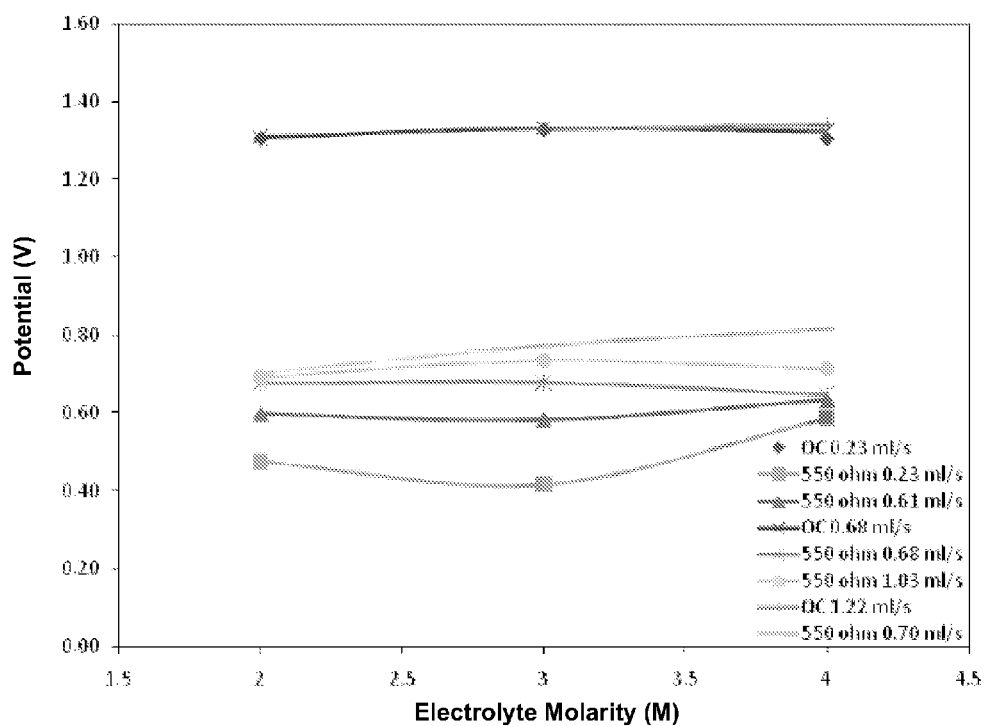
FIG. 16 is a comparison of convection battery performance at different electrolyte molarities.

A similar experiment was performed using the Experimental System 3—½" Convection Flow Half-Cells. The anode was granular zinc and the cathode was 75 wt % graphite and 25 wt % large particle MnO2. FIG. 16 shows the impact of electrolyte molarity on the performance of a convection battery consisting of two cells spaced 23 cm apart. Molarity had little impact. Higher flow rates increased voltage.

Example 11

Impact of Cell Separation Distance

This example demonstrates that increasing separation distances between the anode and cathode results in lower voltages available to loads (e.g. higher overpotential losses).

A battery was prepared using the Experimental System 3—½" Convection Flow Half-Cells. The anode was granular zinc, the cathode consisted of harvested cathode inter-mixed with stainless steel wool, and stainless steel shot was used as a space filler. A 550 ohm resistance was used with a 4 molar potassium hydroxide electrolyte. Table 11 demonstrates that decreases in the separation distance between the electrodes led to increases in voltage.

TABLE 11

Impact of distance between anode and cathode.

| Tube Length (cm) | 2.5 | 2.5 | 2.5 | 33 |
|---|---|---|---|---|
| Average V | 1.33 | 1.26 | 1.23 | 0.69 |

A system using the Experimental System 3—½" Convection Flow Half-Cells was prepared with an anode of granular zinc and a cathode of 75 wt % graphite and 25 wt % large particle (0.5 mm) MnO2. A 550 ohm resistance was used with a 4 molar potassium hydroxide electrolyte. Table 12 presents the results, i.e., decreasing separation distances between the electrodes led to increasing voltages.

TABLE 12

Impact of distance between the electrodes.

| Flow Rate (ml/s) | 0.68 | 0.68 | 0.68 | 0.68 |
|---|---|---|---|---|
| Tube Length (cm) | 13 | 23 | 33 | 43 |
| Average V | 0.744 | 0.647 | 0.608 | 0.556 |
| Std Dev | 0.037 | 0.013 | 0.015 | 0.025 |

A battery using the Experimental System 2—⅜" ID Convection Battery was prepared with anode of granular zinc and cathode of 75 wt % graphite and 25 wt % large particle MnO2. The battery was used with a 2 molar potassium hydroxide electrolyte. Table 13 illustrates that a decrease in the separation distance between the electrodes led to an increase in voltage.

TABLE 13

Impact of distance between anode and cathode.

| Resistance (Ohms) | 550 | 550 | 47 | 47 |
|---|---|---|---|---|
| Tube Length (cm) | 2.5 | 1 | 2.5 | 1 |
| Average V | 1.00 | 1.04 | 0.35 | 0.54 |

Example 12

Permeability

The permeabilities (in Darcys) of select materials used in these examples were determined. The experimental system consisted of a gravity-fed burette connected to a 0.375 inch ID packed bed approximately 1 inch deep of the indicated materials. The fabrication of the large particle carbon is presented below in Example 13. The results are presented in Table 14.

TABLE 14

Permeabilities of cathode and anode materials.

| Material | Fluid | Average Permeability (Darcy) | Standard Deviation | Number of Trials |
|---|---|---|---|---|
| Graphite | Water | 5.61 | 0.076 | 2 |
| Large Particle Carbon | Water | 19.8 | 2.27 | 3 |
| 4K | Water | 0 | N/A | 1 |
| Zn (powder) | Water | 0.18 | N/A | 1 |
| Manganese Dioxide (99%) | Water | 27.3 | 2.56 | 8 |
| Manganese Dioxide (90%) Powder | Water | 0 | N/A | 1 |

The data indicates that fine powders do not allow flow, and so, convection battery anode and cathode materials must meet a minimum permeability criteria to be used in a convection battery. The permeability of mixtures of the indicated materials will be different than the values indicated. This is specifically the case when the packed beds of materials have depths greater than 2 cm. For some of the illustrative examples previously described the packed bed depths were about 0.3 cm.

Example 13

Conductivity

This example illustrates that large particle char can be heat-treated to increase conductivity. Also, the results indicate how increased compression forces (indicated as pressure) increase conductivity the particulate materials. The Experimental System 1—Diffusion Test Cell was configured to measure the conductivity of materials packed between the two current collection plates.

Figure 17:
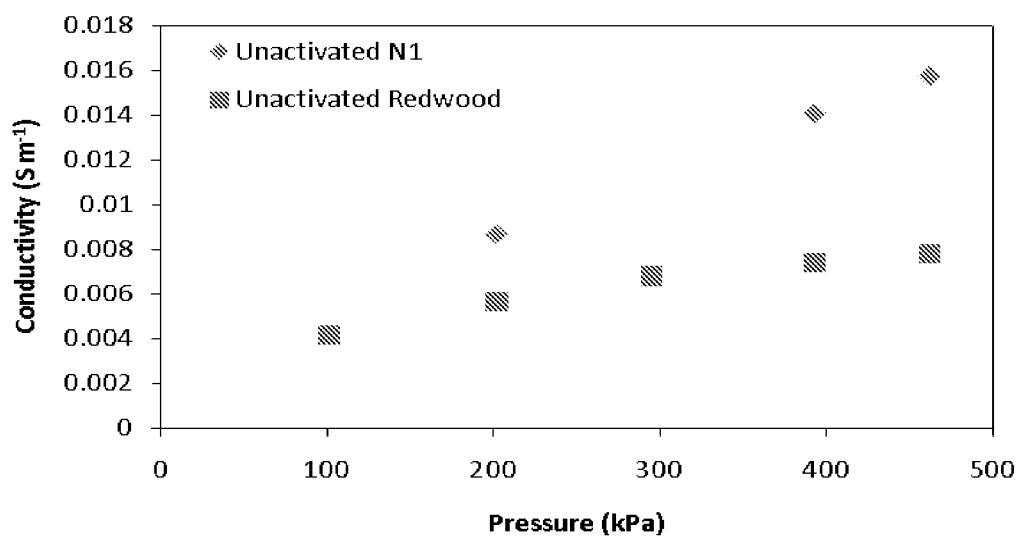
FIG. 17 summarizes the effect of compression force on the conductivity of untreated char.
Figure 18:
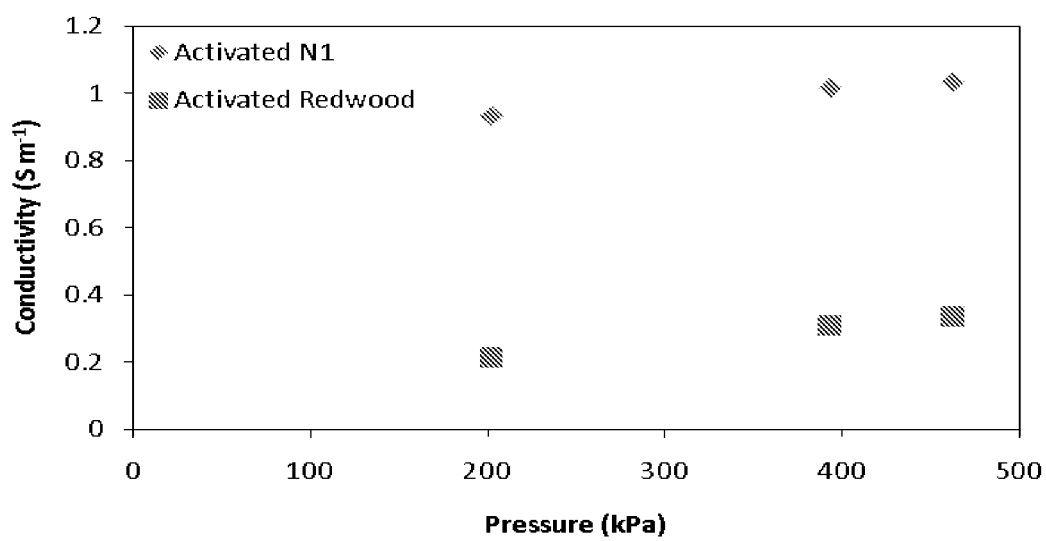
FIG. 18 summarizes the effect of compression force on the conductivity of activated char.

As shown in FIG. 17, the unactivated char had very poor conductivity, i.e., in the range of 0.04 to 0.018 S/m. After the activation at 790° C., the conductivity was increased about 100 times in magnitude (see FIG. 18). The char treated in this manner was able to withstand 500 kPa compression forces with good permeability as demonstrated in Example 12. The surface area of the char was estimated to be about 700 m$^2$/g.

Example 14

Impact of Non-Conductive Ion Exchange Packing

This example illustrates that the use of non-conductive ion exchange material as the non-conductive spacer between the cathode and anode improves battery performance. Improvements included increased voltage and the ability to maintain voltage (at least for limited time periods) without flow of electrolyte.

A battery using the Experimental System 2—⅜" ID Convection Battery was prepared including about 1 gram of granular zinc as a packed-bed anode; about 1 gram of 30 wt % large particle MnO2 and 70 wt % 4K carbon as the packed-bed cathode; and Amberlyst A26 OH strongly basic polymeric ion exchange resin as the non-conductive spacer of about 2.5 cm depth with glass wool placed between this resin and the anode/cathode.

The electrolyte was 2 M potassium hydroxide which flowed in at the bottom of the experimental system and contacted the packing materials in the following order: cathode packed bed, glass wool, polymeric (ion exchange resin, glass wool, anode bed.

For comparison purposes, a control battery was assembled and tested where the polymeric (ion exchange) resin was replaced with stainless steel shot (glass wool provided insulation from electrical conductivity).

The battery containing the ion exchange packing had improved performance including higher voltages and ability to temporarily operate well without flow of electrolyte.

The use of ion exchange materials to improve battery performance is not limited to battery devices that use carbon-based electrodes. Ion exchange materials enhance the convective flow of charged electrolyte in the non-conductive spacer between electrodes by providing stationary counter-ion sites to at least partially balance the net charge of the electrolyte. One benefit is allowing distances between electrodes, which limits dendrite-based failure modes. Another benefit is improving performance at a given distance between electrodes.

An improved ability for convection of charged electrolytes within a packed-bed anode or packed-bed cathode is also desirable. To realize enhanced flow within a packed-bed electrode, ion exchange media may be mixed with anodic or cathodic packed bed materials in the anodic/cathodic electrodes. Alternatively, ionic exchange ability may be created by adding fixed charges onto conductive packing used in electrodes. For example, ionic functionality may be added to high surface area carbons used in packed beds.

What is claimed is:

1. A convection battery device 100 comprising:
    a. an anode packed bed 102 comprising an anode material 108, wherein the anode material 108 comprises a plurality of anode granules wherein the anode packed bed 102 has a permeability greater than 0.02 Darcies and conductivity greater than 0.005 S/m, and wherein the anode material 108 further comprises an active anodic material;
    b. a cathode packed bed 104 comprising a cathode material 110, wherein the cathode material 110 comprises a plurality of cathode granules wherein the cathode packed bed 104 has a permeability greater than 0.02 Darcies and conductivity greater than 0.005 S/m and wherein the cathode material 110 further comprises an active cathodic material, and wherein the anode packed bed 102 is electrically insulated from the cathode packed bed 104; and
    c. a pump 106 configured to provide convection of an electrolyte 112 between the anode packed bed 102 and the cathode packed bed 104.

2. The device 100 of claim 1, wherein the anode packed bed 102 is compressed by an anode compressive force greater than about 100 kPa, and the cathode packed bed 104 is compressed by a cathode compressive force greater than about 100 kPa.

3. The device 100 of claim 2, wherein the anode compressive force is greater than about 300 kPa, and the cathode compressive force is greater than about 300 kPa.

4. The device 100 of claim 3, wherein the anode compressive force ranges from about 500 to about 1000 kPa, and the cathode compressive force ranges from about 500 to about 1000 kPa.

5. The device 100 of claim 1, wherein the anode material 108 and the cathode material 110 have a porosity of at least 0.7, and a total mesopore volume of at least 0.5 cm$^3$/g.

6. The device 100 of claim 1, wherein the anode material 108 comprises at least 50% of a carbon matrix material by mass and the cathode material 110 comprises at least 50% of a carbon matrix material by mass.

7. The device 100 of claim 1, wherein the active anodic material comprises a metal selected from lithium, zinc, lead, magnesium, manganese, aluminum and combinations thereof.

8. The device 100 of claim 1, wherein the active cathodic material comprises a material selected from lithium oxide, zinc oxide, lead oxide, magnesium oxide, manganese oxide, aluminum oxide, cobalt oxide, vanadium oxide, titanium sulfate, molybdenum oxide, iron phosphate, and combinations thereof.

9. A convection battery device 100 comprising at least one cell, the device 100 comprising:
    a. a permeable anode 102 having a permeability greater than 0.02 Darcies and a conductivity greater than 0.005 S/m, wherein the permeable anode 102 comprises an anode material 108 comprising an active anodic material;
    b. a permeable cathode 104 having a permeability greater than 0.02 Darcies and a conductivity greater than 0.005 S/m, wherein the permeable cathode 104 comprises a cathode material 110 comprising an active cathodic material;
    c. a pump 106 configured to provide convection of an electrolyte 112 between the permeable anode 102 and permeable cathode 104; and
    d. a spacer bed 114 located between the permeable cathode 104 and permeable anode 102 wherein the spacer bed 114 has a permeability greater than 0.02 Darcies and a conductivity less than 0.001 S/m.

10. The device 100 of claim 9 wherein the anode material 108 comprises discrete particles, and the cathode material 110 comprises discrete particles.

11. The device 100 of claim 9, wherein the spacer bed 114 creates a separation between the permeable anode 102 and the permeable cathode 104 of at least 0.1 mm.

12. The device 100 of claim 11, wherein the separation ranging from about 2 mm to about 20 mm.

13. The device 100 of claim 12, wherein the separation ranges from about 2 mm to about 10 mm.

14. The device 100 of claim 12, wherein the permeable anode 102 comprises carbon particles wherein the carbon particles have a BET surface area greater than 1000 $m^2/g$.

15. The device 100 of claim 14, wherein the spacer creates a separation ranging from about 2 mm to about 20 mm.

16. The device 100 of claim 9, wherein the spacer bed 114 is located between a cathode exit surface and an anode entrance surface wherein the spacer creates a separation between the surfaces greater than 0.1 mm.

17. The device 100 of claim 16, wherein the spacer creates a separation between about 2 mm and about 10 mm.

18. The device 100 of claim 9 wherein the spacer bed 114 comprises an ion exchange material.

19. A convection battery device comprised of a first electrode 506, a last electrode having the same polarity as the first electrode 506, and at least one counter-electrode 510 located between the first electrode 506 and the last electrode 508 wherein:
   a. the counter-electrode 510 has a polarity opposite that of the first electrode 506;
   b. the first electrode 506 is connected to the last electrode 508 by an electrical conductor 516 such that the first electrode 506 and the last electrode 508 are electrically coupled;
   c. a non-conductive ion exchange spacer 512 having an attached ion molarity functionality greater than 0.05 located between the first electrode 506 and the counter-electrode 510; and
   d. a non-conductive counter-ion exchange spacer 514 having an attached ion molarity functionality greater than 0.05 located between the counter electrode 510 and the last electrode 508.

* * * * *